United States Patent [19]
Pryor

[11] Patent Number: 5,917,726
[45] Date of Patent: Jun. 29, 1999

[54] INTELLIGENT MACHINING AND MANUFACTURING

[75] Inventor: Timothy R. Pryor, Windsor, Canada

[73] Assignee: Sensor Adaptive Machines, Inc., Windsor, Canada

[21] Appl. No.: 08/154,028

[22] Filed: Nov. 18, 1993

[51] Int. Cl.$^6$ .................................................. G06F 19/00
[52] U.S. Cl. .................... 364/468.01; 29/712; 702/84
[58] Field of Search ................ 364/468.01, 468.02, 364/474.02, 474.11, 474.17, 474.34, 474.35; 29/712; 702/84

[56] References Cited

U.S. PATENT DOCUMENTS

| | | | |
|---|---|---|---|
| 4,321,679 | 3/1982 | Fujie et al. ........................ | 364/474.34 |
| 4,373,804 | 2/1983 | Pryor et al. ............................ | 356/3.07 |
| 4,394,683 | 7/1983 | Liptay-Wagner et al. .............. | 348/128 |
| 4,403,860 | 9/1983 | Pryor ...................................... | 356/375 |
| 4,409,718 | 10/1983 | Pryor ................................... | 29/407.04 |
| 4,453,082 | 6/1984 | Pryor ................................. | 250/559.33 |
| 4,559,684 | 12/1985 | Pryor ..................................... | 29/888.06 |
| 4,574,199 | 3/1986 | Pryor ................................. | 250/559.33 |
| 4,576,482 | 3/1986 | Pryor ...................................... | 356/376 |
| 4,585,350 | 4/1986 | Pryor ...................................... | 356/375 |
| 4,654,949 | 4/1987 | Pryor ................................... | 29/407.04 |
| 4,667,231 | 5/1987 | Pryor ...................................... | 348/128 |
| 4,719,586 | 1/1988 | Moyer et al. ...................... | 364/468.15 |
| 4,796,200 | 1/1989 | Pryor ...................................... | 395/94 |
| 4,851,905 | 7/1989 | Pryor ...................................... | 348/169 |
| 4,896,086 | 1/1990 | Miyahara et al. ................... | 318/568.1 |
| 4,932,828 | 6/1990 | Katae et al. ............................ | 414/286 |
| 5,005,277 | 4/1991 | Uemura et al. ...................... | 29/407.04 |
| 5,010,634 | 4/1991 | Uemura et al. ............................ | 29/407 |
| 5,112,131 | 5/1992 | Pryor ...................................... | 356/376 |
| 5,148,591 | 9/1992 | Pryor ......................................... | 29/407 |
| 5,168,453 | 12/1992 | Nomaru et al. ..................... | 364/468.21 |
| 5,272,805 | 12/1993 | Akeel et al. ............................... | 29/712 |
| 5,381,339 | 1/1995 | Yoko et al. ........................ | 364/468.19 |

Primary Examiner—Paul P. Gordon
Assistant Examiner—Sheela S. Rao
Attorney, Agent, or Firm—Larson & Taylor

[57] ABSTRACT

Methods and apparatus for "Intelligent" control of production processes such as machining, casting, heat treating and welding are disclosed. The key enabler of such control is electro-optical or other suitable sensors, generally non contact, capable of rapidly and accurately acquiring data from parts and tools used to produce them in a production "in-process" environment. Systems are disclosed to control not only the instant operation, but those processes connected therewith, both upstream and downstream. Data bases are generated and knowledge bases are used. Application of the invention can improve quality and productivity, and allow the production of parts which have unusual or individual material characteristics.

57 Claims, 11 Drawing Sheets

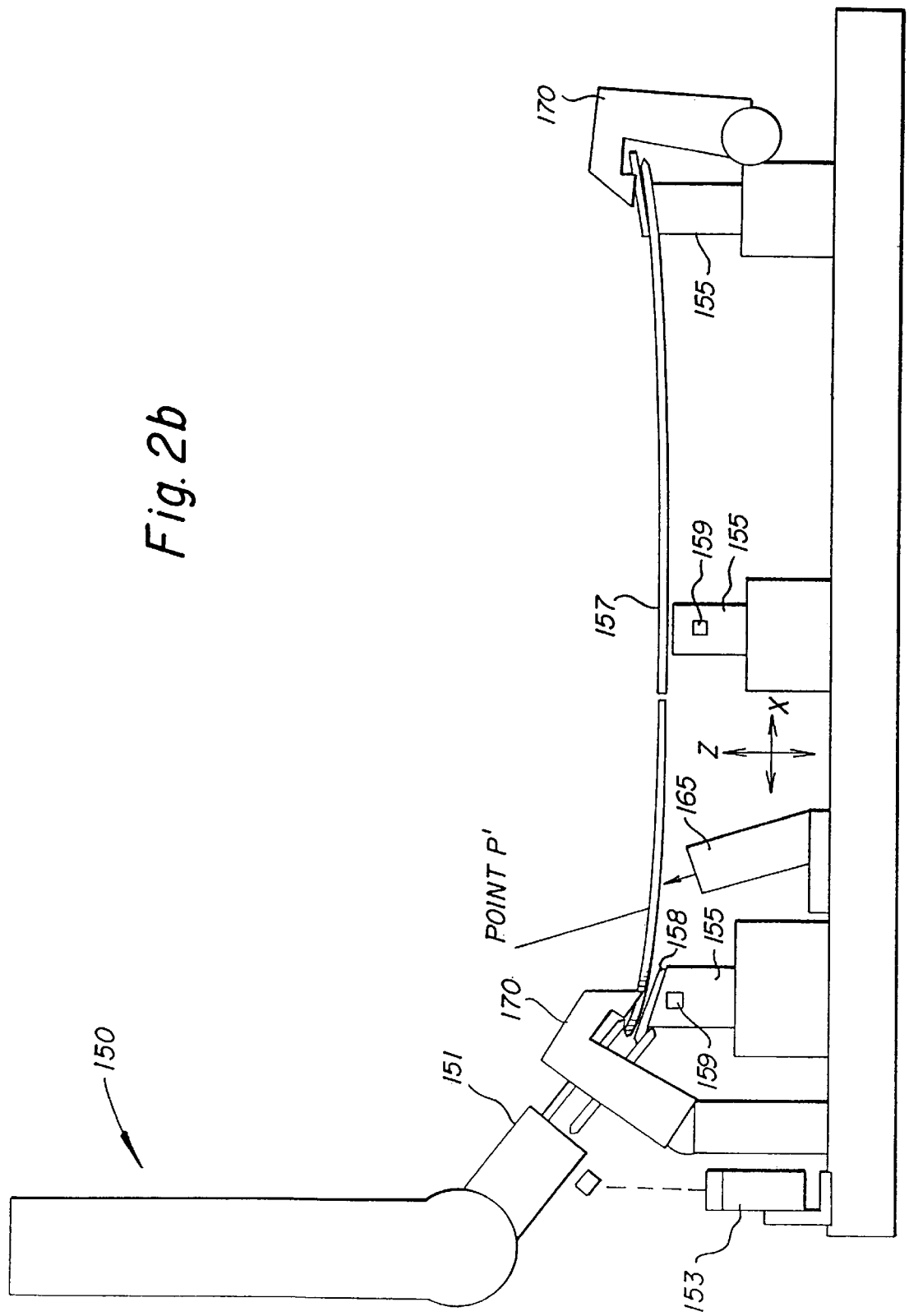

INTELLIGENT MACHINING AND MANUFACTURING

CROSS-REFERENCE TO RELATED APPLICATIONS

Copending Applications on Machining Subject Matter Herein Incorporated by Reference A. Apparatus for determining dimensions, U.S. Ser. No. 08/124,605, filed Sep. 21, 1993 (now U.S. Pat. No. 5,362,970)

B. Controlled machining, U.S. Ser. No. 07/509,295 (now U.S. Pat. No. 5,112,131)

C. Control of Lathes, U.S. Ser. No. 07/884,331, filed May 18, 1992 (now abandoned)

D. Lathes PCT/US93/04857, filed May 17, 1993

E. Contact CIP U.S. Ser. No. 08/071,012, filed Jun. 2, 1993

Copending Applications on Sensing or Assembly Related Subject Matter Herein Incorporated by Reference 1. Method and Apparatus for assembly of car bodies and other 3 Dimensional objects, PCT Appl. PCT/CA92/00296, filed Jul. 30, 1992

2. Method and Apparatus for Assembly, U.S. Ser. No. 07/728,682, filed Jul. 12, 1991 (now U.S. Pat. No. 5,380,978)

3. Robot vision using targets, U.S. Ser. No. 07/664,574, filed Mar. 6, 1991 (now U.S. Pat. No. 4,654,949)

4. Target Based determination of robot and sensor alignment, U.S. Ser. No. 07/733,035, filed Jul. 22, 1991 (now U.S. Pat. No. 4,796,200)

5. Vision assisted fixture construction, U.S. Ser. No. 07/866,653, filed Apr. 8, 1992 (now U.S. Pat. No. 5,267,143)

6. Robot Vision using Holes, corners, etc. U.S. Ser. No. 07/697,345, filed May 9, 1991 (now abandoned)

7. Improvements in Assembly Tooling, U.S. Ser. No. 08/002,384, filed Jan. 11, 1993 (now abandoned)

8. July 91 Car Body Assy, U.S. Ser. No. 07/728,682, filed Jul. 12, 1991 (now U.S. Pat. No. 5,380,978)

REFERENCED U.S. PATENTS BY THE INVENTOR

1. U.S. Pat. No. 4,373,804 Method and apparatus for electro-optically determining the dimension, location and attitude of objects 2. U.S. Pat. No. 4,394,683 New photodetector array based optical measurement systems 3. U.S. Pat. No. 4,453,085 Electro-optical systems for control of robots, manipulator arms and coordinate measurement machines.

4. U.S. Pat. No. 4,667,231 Electro optical part inspection in the presence of contamination and surface finish variation.

5. U.S. Pat. No. 4,774,751 Electro optical and robotic casting quality assurance 6. U.S. Pat. No. 4,576,482 Electro-optical inspection 7. U.S. Pat. No. 4,403,860 Apparatus for determining dimensions 8. U.S. Pat. No. 4,574,199 Sensing location of an object 9. U.S. Pat. No. 4,585,350 Pulsed Robotic Inspection 10. U.S. Pat. No. 4,559,684 Controlled Machining of combustion chambers, gears, and other surfaces

OTHER U.S. PATENTS

1. U.S. Pat. No. 5,010,634, Vehicle assembly Method and Apparatus, assigned to Nissan Motor Co.

OTHER U.S. PATENTS

1. U.S. Pat. No. 5,010,634, Vehicle assembly Method and Apparatus, assigned to Nissan Motor Co.

BACKGROUND OF THE INVENTION

Introduction

The thrust of manufacturing in the decades to come will be toward continuing reductions in cost, improvements in quality, and most dramatically for the change in manufacturing methods, a vastly increased flexibility of manufacture to respond immediately to market trends. Such flexibility has been the hallmark of the success of companies in the clothing business, for example, and is now being advocated for all types of business including those in the traditional hard goods sector. A Term, "Agile Manufacturing" has been coined to describe this new paradigm.

The provision of manufacturing systems however that can deliver agile performance while maintaining the lowest cost and highest quality is extremely difficult. In years past, these three goals each has been viewed as mutually exclusive with the others. For example, in order to reduce cost, the famous Ford assembly line eliminated flexibility to market change, creating one style and producing it for a long period of time, with at least reasonable quality. Recently the Japanese, for example in the car business, have begun to hone the traditional processes of car manufacture to a fine degree raising the level of quality well beyond its previous state, but still with very little flexibility. Other cars, such as certain exotic marquees made in much smaller quantities, achieve quality and flexibility, but at high cost. Even with these however, flexibility is still not achieved until such extremely small volumes are reached that the car becomes virtually hand made.

This being the case then, how can mass market items produced rapidly to market change in ever smaller economic lots at lowest cost to be affordable and still maintain the highest quality? It seems virtually impossible, and yet this is the goal that has been set out by, both the Japanese and American studies for achievement in the 21st century.

If this isn't enough, further thrusts toward improved performance, both environmentally and performance are required—in the car business for example being acceleration, fuel economy, etc. In order to achieve approved performance, much higher accuracies are being required in the production of key critical components.

The accuracy requirements are not simply limited to the powertrain or functional components, but also related as well to almost all other parts, such as anti-skid brake systems, and even the sheet metal body, where a relentless quality push has taken place in North America, which however at some point approaches the law of diminishing returns is taking place (since the benefits are increasingly subjective as opposed to functional).

Before proceeding to the technical aspects of the invention, there are other trends in the manufacturing technology world today. Some of these have been pinpointed in the Lehigh Study, and other recent attempts to formulate industrial policy in the United States. The area that this application and my previous work is most concerned with, is intelligent sensors, machine intelligence, and knowledge based systems. These form the building blocks on which the flexible machines and automation that can achieve the goals above in an accurate low cost manner can be built. They are also in an area that are very difficult to do, and to some degree only now begins to become possible economically due to the drastically lowering cost of the computation facilities, and the maturing of key sensor technologies, particularly electro-optics/machine vision, which would allow them to be used reliably in plant applications.

There are other trends, such as the move toward openness in the controls areas, which allows the sensory data to be imputed in a manner suitable for action on the plant floor, but without being locked up by proprietary systems. There is also obviously an ever present trend toward lower computer costs, which can be extrapolated on to produce, along with lower memory costs, a massive increase in the ability to use "knowledge and intelligence" to deal with the ever present problems on the plant floor. While the computation and memory costs are changing rapidly, sensing technologies, however, are not. It can be assumed that those in place today will, in "ever better" but not drastically changed form, provide the basis for the manufacturing systems of the year 2000 onward.

The trend toward knowledge and intelligence is manifested in the ever increasing role of software, and the operation of reliable software in these machines is critical. Also critical is that the sensory data provided, which yields the basis on which intelligence can be done is correct.

This leads to the next issue, the selection of sensors. Here, it is my thesis, that just as in the factory of today, the principal sensor is the worker's eye, so it is here that some sort of electro-optically based sensor, whether it approximates human vision or not is indeed key. There are many reasons for this, among them non-contact operation, freedom from wear, large stand-off, accuracy, multi-varied task ability, etc. I have found in the course of working in this field for the last 20 years, that most all variables that need to be sensed in the manufacture of hard goods, can be indeed sensed electro-optically, and generally best with image based sensors of some kind. In some cases, they may be better sensed by other means, such as contact gages or the like, but in general the electro-optical solution is the one with the most application, and most approximating the human.

The key though is to do what the human can do flexibly, but to also achieve the precision and the freedom from fatigue that machines can provide. The key sensor for this purpose, that can guide machines in a human like manner, but with the accuracy of the machine, is electro-optical—and generally image based—just like the human eye.

The Importance of the Speed of Measurement—
Without Crashes

A key issue is that many have not have realized is the importance of the speed of measurement to intelligent process control. While one can have a workable measurement of, let us say, the part diameter with contact probes that could operate within a machine tool, the actual use of such contact probes is very limited. The slowness of their operation and their propensity for "crashes" has limited their application, particularly in high production applications, where the advantages of such intelligent control, built up of a number of small improvements in every sector have not heretofore been fully realized. Non contact, long standoff, crash free operation suitable for in process, in machine operation is thus very important.

The Importance of the Synergistic Sum of Small Improvements

The summation of a number of small improvements can create overall a large difference between use of the intelligent machines and systems, and conventional ones. For example, implementation of intelligent control of turning operations alone in one large automakers production is estimated to save $200,000,000 per year if implemented across the board—even though each individual feature itself, such as longer tool life might only save a small fraction of this number. There is an economy of scale of sensing and intelligence.

We also have to look at the issues that surround the ability of the machine to make parts that are better on a statistical variability basis, by a large measure, even though the machine itself, on the day of its manufacture, is perhaps hardly better than a regular machine of the same type. This has very important ramifications for the "safety" factors that are used in modern day design of manufactured parts.

Intelligence vs Adaptive Control

Machine Intelligence is often considered to be adaptive control; that is taking the immediate inputs from the process, such as forces, vibration, etc., and feeding them back to control the machine. Such efforts go back to the '50's, as evidenced by the prior art cited in copending applications c and d.

Historically, such adaptive control has largely concerned itself with the machine's physical variables and their input to control of the machine, using these variables, such as tool force, for example, to infer the proper maintenance of cutting conditions in machine tools, for example. Heretofore, there has been, by comparison, relatively little emphasis on any relationships of the part variables such as dimension or finish, or in the interplay between tool and part variables, also in related processes. The tool was assumed perfect, and the machine assumed to go to the position desired—neither of which is true in practice at the accuracy levels required for modern parts manufacture.

SUMMARY OF THE INVENTION

Goals of the Application

This invention is related to numerous other of my inventions, listed in the references above, and continues in part the ideas represented therein.

The invention seeks to illustrate that the modern sensing capabilities, particularly, but not necessarily those provided by electro-optical sensors, can provide the creation of data within a manufacturing system that can be used for the intelligent control of the process, both of the instant work element such as a machine tool, or welding tool, and of the process elements in the factory that connect with it.

The goal of this invention is to demonstrate the intelligent control of manufacturing processes, and in particular machining and fabricated parts assembly.

It is a goal of this invention to disclose a method for automatic development of processes within a machine, or a cell containing a group of similar machines, or a process including a number of inter-connected operations, including a machine.

It is also a goal of the invention to illustrate means for controlling the removal, or addition of material to objects.

It is also a goal of the invention to provide a means for automatically programming machine tools from master parts.

It is a goal of the invention to provide a common operator display for machines, such as machine tool, which can provide CCTV based video data presentation of actual images from within the process, as well as from sensed data concerning the tools or parts, and from training and other diagnostic presentations of the operation of the machine.

It is also a goal of the invention to control movements of hydraulic, or other micropositioning devices and assembly tools to change the location of the positioning points to improve the product produced.

It is also a goal of the invention to provide sensing devices for surface and hole location built within the press dies, as well as in assembly tools.

It is also a goal of the invention to establish data bases, which can not only be accessed concerning parts and tools used within a machine, and also be accessed and transmitted to other processes connected to a machine for control thereof.

It is also a goal of the invention to illustrate the interactive control of operations, using high speed optical sensing, such as provided electro-optically to gather sufficient data on production parts that intelligent decisions, both for that machine, and other inter-connected processes and machines can be made.

It is a goal of the invention to illustrate means for controlling the casting and heat treating processes providing parts to machine tools.

It is a goal of the invention to provide novel means for improving the accuracy of turned surfaces worked in a machine tool.

It is a goal of the invention to account for the deformation of materials under working, and for unpredictable deformations due to complex, external and internal part geometries, and in complex fabricated assemblies.

It is a goal of the invention to provide for means and novel methods for obviating the deleterious effects of contamination, on electro-optical sensor windows used in production machines.

It is a goal of the invention to acquire and utilize intensive part, or tool surface data to provide a best fit of surfaces, and better predict the need for contour machining, or other finishing processes on parts, and for the assembly into other parts.

It is the goal of the invention to describe a system for assembling car bodies and other equipment combining a reconfigurable fixed tooling, as well as robotically positionable, and programmable part location.

It is a goal of the invention to disclose means for using a machine to learn the characteristics of parts produced within it, and parts presented to it, as well as to learn the correct settings of sensor units used therefore of master parts of the types used.

It is a further goal of the invention to illustrate new forms of checking fixtures for sheet body metal components, which can be used easily within coordinate measuring machines, as well as for rapid data taking on the plant floor, including fixtures that can be reconfigured for other applications, or new models.

It is a goal to show how cost of production can be reduced in all its aspects by considering the use of intelligence systems to optimize all processes linked together to produce a given part (plastics, stamping, fasteners, machining, casting, etc.

BRIEF DESCRIPTION OF THE DRAWINGS

FIGS. 2a and 2b are diagrammatic views of sheet metal assembly tools equipped with non-contact sensors for monitoring parts in place in the tools.

DESCRIPTION OF THE PREFERRED EMBODIMENTS

FIG. 1

Figure 1:
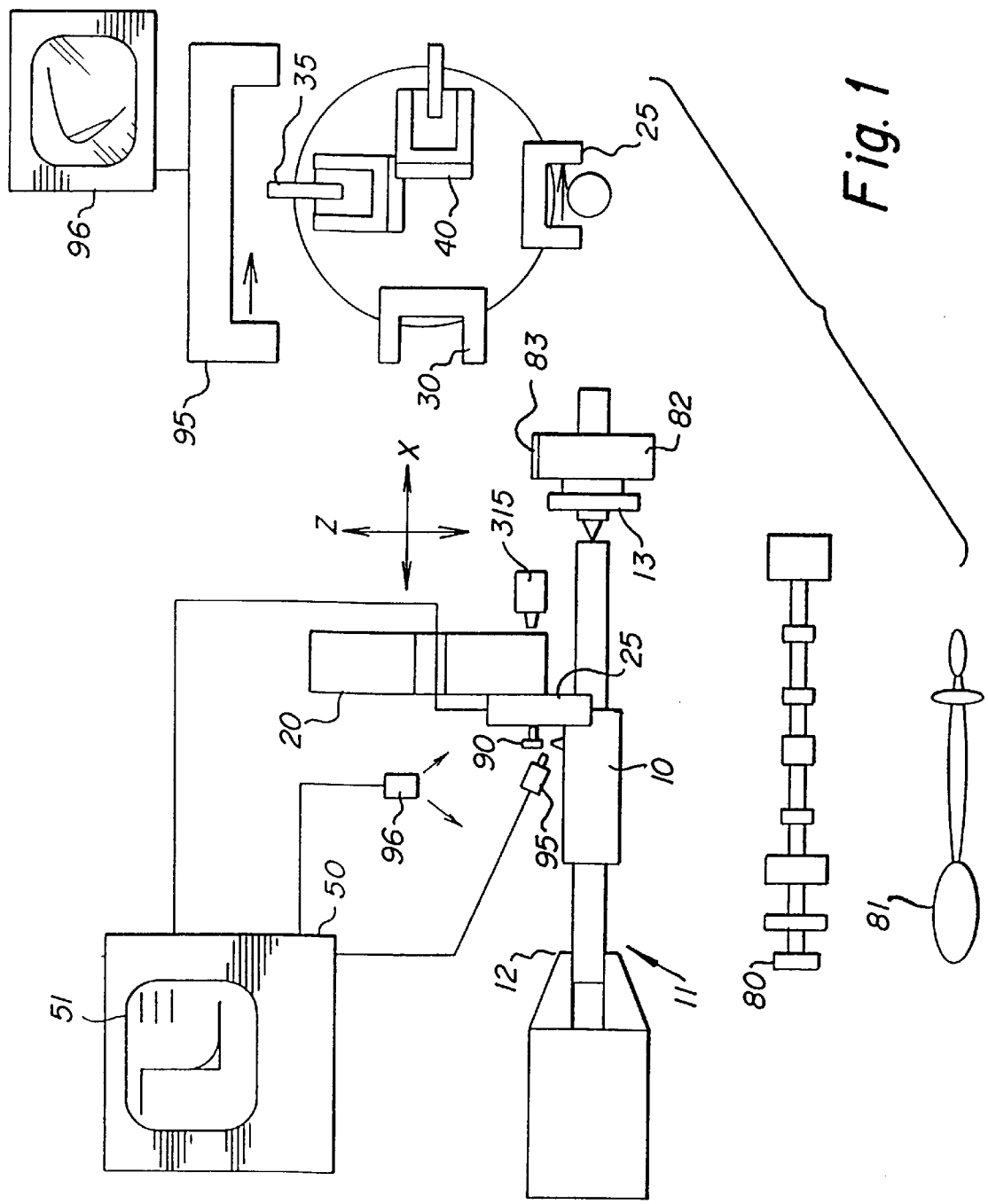
FIG. 1 is a diagram of a machine tool, in this case an NC Lathe equipped with sensors and displays of the invention and further illustrating a sensor controlled process to remove or add material as a result of sensed variables, transmission of video data from inside the machine to a controller, and set up of the machine from a physical master.

FIG. 1 illustrates a basic embodiment of the invention. A standard NC lathe, of which the working area is 11, is depicted, contains chuck 12 and tailstock with center 13 on which a workpiece 10 is mounted. A turret 20 is used to programmably position different tools such as 35 into working position in order to turn different diameters and lengths of diameters on the shaft. The turret is positionable by the machine in both x & z axes.

Typically the turret will have 8–10 tool positions to allow roughing and finishing tools to be put in or spare tools so that one doesn't have to be set up each time, but a group, for example, can be set up during down times, and simply indexed in when a tool breaks. The problem of tool set up will be addressed elsewhere, but it basically involves putting the tool tip at the correct location known to the machine, whether it checked after putting in and the machine is corrected, or its put in to a correct location. This particular operation is made much simpler by use of the invention herein.

In any case, in this particular illustration, two of the tool positions on the turret are occupied by sensors, in this case, preferably optical sensors, such as 25 to detect size, which is diameter and in the version shown, diameter and length simultaneously, and sensor 30, which detects surface finish of the particular outer diameters being precision turned in this application. Typically such applications are on hardened parts, Rockwell 58 to 64 approximately.

The matrix array based sensor 25, shown in an operable position at looking at both a small and large diameter of the part that has been previously turned in another operational cycle of the machine, has its display 51 shown in this case as showing the processed data by the intelligence system control unit, 50 showing the magnified image of the part surface, and the data of the location of the step axially from the end of the part, or another datum, and the two diameters represented. If a radius is present, due to either a contour turning operation or due to simply tool wear, this radius is also shown and any dimensions on it that are desired are displayed.

It is noted that the invention can also be used to measure incoming cast or forged parts, for example. In this case, one might just simply display the raw video profile image of the part to give the operator a feel for what it looked like, although it to can be fully scanned and digitized as shown.

The purpose for scanning an incoming part, preferably after locating and clamping, is to determine if it is straight enough to clean up, that it has sufficient diameter stock for clean up for subsequent machining operations, and that it is not excessively large to cause undue machining time, or tool breakage, including large sections of flash that can snap tools. On the other hand, another reason to scan the incoming part is to determine the optimum cut path, in accordance with the amount of material present. Prescanning a part is also a form of collision avoidance, since misloaded parts, wrong parts and other problem conditions can sometimes occur in high production applications.

This provides a method to dimensionally qualify incoming cast/forged parts and any rough machined surfaces thereon from previous operations. It also provides a means to determine if excessive runout is present, indicative of malformed or contaminated location surfaces on the part or machine (and cause for reject of the part, to avoid waste of machining time)

All of these goals can be expeditiously done with the invention as shown, which is capable of making very rapid measurements. Even relatively simple means can achieve on the order of 5–10 measurements per second, and in the near future with specialized chips this should go at least to the frame rate of the RS170 standard camera utilized (30/sec).

By measurements in this case, per second is meant that the whole amount of data in the field of view is measured, to whatever extent is required, such as the length and diameter in the case shown, the length location of this step and the two diameters, plus any radial data is necessary. It is noted that as shown in the references it is also highly desirable to reject outlying data that may be indicative of Dirt or chips, or coolant residue, etc. on the part, and this processing also has to occur within the time.

A preferred electro-optical sensor operates from profile imaging of the part, as described in the co-pending referenced cases.

It is noted that no such capability as depicted herein, is presently available on any known lathes or machine tools today. The operator display alone is an extreme value for operator understanding of what is occurring in the process, and for set up of the machine and tools. However, the most value comes when the display in the processing unit shown is connected to the controller to allow the true input of intelligence into the machine. Such connections are not easy to perform today, because of the limited capability of present day controllers. This is an area which is receiving intense effort today in certain circles (such as the U.S. Next Generation Controller Project).

In order to keep the sensor unit functioning, two forms of calibration devices are shown. Calibration bar 80 is used periodically to check the correct x and z locations of the sensor used to inspect the bar, and in reality therefore, represents a machine check if the sensor has been previously calibrated using the master rings as shown. The sensor being a digital device and drift free, and one that can also really be calibrated only at the mean, but for confirmation of the plant purposes are usually calibrated at the maximum and mean of its range, or even more particularly of the range and diameters of a particular shaft that is being made in high production.

The various diameters and axial locations of the lands thereon, on the calibration shaft 80 can be in any desired size variation, location, etc., and would typically have, we feel, many more steps, and often smaller as well, then that depicted for clarity in the drawing. In this way the sensor unit can check each in turn, and determine the small offsets to the machine control (typically in the range 1–4 microns), required to update the position of the machine, compared to where it is suppose to be.

In periods of high thermal change, this becomes particularly important as the range of variation location can range from 20–50 microns. It is noted too that the shaft 80 can be made of the same type of material as the machine itself, or of the part being produced, or of in bar, with no thermal change whatsoever to speak of, depending of the goals of the calibration. Because the sensing is fast and quick, and calibration can be accomplished rapidly, and does not take an excessive amount of time from the cycle of the machine, it can be placed in the machine by the operator or automatically loaded by gantry robots used to load the parts.

Calibration artifact 81 is quite different. It is used to calibrate the servo axis of the machine, or a following error, and correct same. This is absolutely impossible today with current controllers to check this in the field, and is a very big task even during the manufacturing of the machine. It can be accomplished routinely with the system here proposed.

However, in order to measure rapidly enough, a high speed linear array capable of thousands of diameter readings a second is required. Such linear arrays may be co-located with the matrix array, or used instead of it, or simply used in another tool sensor position on the machine. A linear array, further, has the advantage, over a slower CCD Camera , that it can be used over much larger ranges as well, but it does not have as good a length measuring capability, and cannot in one view display the image shown on the display 51, although that can be produced by accumulating successive scans and roughly approximated. The problem with linear arrays on length measuring however, is that the edge definition becomes difficult as scanning can only occur in the diametrical direction, and often sufficient lengths points are not available to give as accurate a result as possible for precision manufacture.

The surface finish sensor 30, either optical, capacitance or other satisfactory type, preferably non contact, is utilized as well to check the surface finish produced by the lathe, typically by turning or with any optional tools that might be located in lab in wheels, etc.

The surface finish sensor, as well, can be calibrated against a master ring 82 shown as the large ring at the end in the drawing, which can have typically as well the maximum and mean surface finishes 83 desired on its surface. For best results the diameter of this ring should be more or less the same as the average diameter being turned for best results.

It is also possible, and desirable in many cases, to include a force sensing capability into the machine, for example the 3 axis dynamometer 40, shown under one of the tools. This dynamometer (such as the type sold by Kissler A. G.) is utilized to sense the cutting forces, and feed back to the controller signals that can stop the machine in terms of if tool breakage is detected.

More sophisticated processing of the cutting force signals can also determine if the rate at which wear is occurring, and predict the end of the useful tool life, although the data for this is largely presently available only for carbide tools. A large number of research organizations throughout the world are working on this problem, but a very small percentage of machines have these installed. Units are sold commercially by Montronix Co. and Sandvik, which in order to obviate the necessity to wire dynamometers to each tool, have utilized a dynamometer between the turret and the cross slide of the machine, thereby allowing it to be used for all tools, albeit with substantially desensitized performance.

It is not the intent of this invention to reinvent such piezoelectric force dynamometers, but only to show their beneficial use in conjunction with the optical and IR sensor data here disclosed. As disclosed in the aforementioned copending applications, the optical sensors to inspect the tool directly to confirm any wear that is being picked up by the force detectors for example. Force detectors signals can also give some feeling for the presence of surface finish variation, particularly in the chatter condition, and can again be confirmed with the surface finish sensor (and if severe, with the size sensor).

A separate tool sensor unit, such as 95, can be mounted on the machine, for example, wherein the tool is moved into position to check its location and length, and wear, or breakage if any. This sensor may be cocked at a slight angle to optimize the position of the radius in the tool shown in the display of 96 (which can be physically the same as 51 with image processing performed by 50), which shows the tool tip being located at nominal position $X_0$ and $Z_0$.

As tool tip is worn away as shown in dotted lines with the course of the machine, $X_0$ and $Z_0$ change. The new positions of $X_0$ and $Z_0$ can be calculated as well as any positional variations in the machine itself, due to thermal build up, etc. and can all be corrected in the computer to come to the optimal cutting position. At some point the wear becomes too great, typically in the order of 0.005–0.010" deep, and the tool needs to be replaced. This also becomes evident in surface finish degradation typically on the surface, which also can be sensed by the invention.

It should be noted that the feed rate of the machine can be determined from the turning grooves that are seen on the image on display 51, if desired, as can the height of the grooves on the rougher surfaces.

The disclosed invention can also be used to "trim" an existing part to size, by purposefully taking a final optimum cut to establish finish size, with other cuts matched via sensory feedback to leave the right amount of stock for the final cut.

As noted above, sensor 25 can be used to prescan a part for collision prevention purposes. However, where the part can be substantially out of location, a high precision sensor unit usable for final inspection of dimensions, grooves, etc, may have to get undesirably close to the part. In this case the sensor of 1c is used, which can triangulate from a substantial distance off the part, say to 100 mm and possibly in two axes (for diameters, and faces).

Such a electro-optical triangulation sensor can utilize an analog spot position sensing detector such as a UDT SC10 or a digital diode array such as a Reticon 1024G to sense the position of the image of a laser spot projected on the part surface (see reference 1). It also can be used in the invention to measure the finished part, and in some cases can be used to look at the tools as well (in another turret say).

Other sensors, such as inductance or ultrasound can also be used, but they generally do not have the resolution at a large standoff desired for mensuration purposes, even of castings. They can however be used for crude collision avoidance.

Another feature of the integration of video data on the controller of the machine (which could be the same as intelligent controller 50) is to integrate the functions of the maintenance activities of the machine with those of the video display of the controller here described. Indeed, this can also be integrated with data taken by the machine, into how to actually better diagnose the machine functions.

Machine performance on various numbers of parts, in terms of forces, torques vibrations, etc, and the problems that have been indicated by the checking of the parts produced, or the tools can all be logged on the controller of the invention, as well as displayed in video or data form. Video data taken from the actual machine operation (as opposed to the process data of the part edge, or the tool edge), can be overlaid with segments of the machine operations that should exist. This function is not limited just to machine tools, being valuable for press automation, robotic systems, material handling, etc.

The same sort of visual data can be compared it to the actual performance of the process on the parts, in terms of statistics, or other descriptive data, or compared to the actual edges of tools, etc.—overlaying results from previous runs and other data associated with the parts of the same or different types. Diagnostics of the machine can also compare manual offline gage or other test data versus the data on the parts provided by in machine sensors.

Data from other times and places stored on CD ROM or other mass storage media can also be so compared. For example, machinability tables be on CD ROM, as can visual displays of the actual machining from past operations—eg of the part produced, the sensor data obtained from "n" runs and the like. Even a display of the chips coming off a successful operation, and their color, width or length for example can be valuable in setting up a machine. Conversely, a display of video data concerning improper conditions can also be invaluable for trouble shooting.

"In-machine" sensors used for adaptive control can also be used for diagnostic purposes. For example, if difficulty exists machining a certain part at the given part rates with a particular speed and feed selection for a given tool, analysis of the force data taken can determine that an unwanted machine vibration is occurring in some machine regime. The Infrared part temperature sensor too, may pick up unusual temperature rises in the part, indicative of a change in material conditions or tool conditions.

Using the invention, the maintenance person can go to the video display, and then test various instant characteristics of the machine or process, and look at what it would be under various other conditions—either simulated or real using known data from the past—either from the same machine or similar operations.

The transmission of video data from inside the machine to the controller is shown also in this case. Video camera 95 is mounted in the machine, and can observe the actual cutting area as has been described in the co-pending applications. It can also be used, such as video camera 96 to look at the general area of the machine.

Both of these video cameras, and the video cameras that may be associated with the optical sensing of size and finish of the part, and tool shape can all be transmitted to an external video monitor at the controller of the machine, or at an external remote monitor used for process monitoring of a group of automatic machines. This is a desirable feature to build into the monitoring counsel, as it allows operators to see "what is going on" without necessity to open up the machine.

Also it is noted that these sensor units can desirably be equipped with FM transmitters to transmit their video data to a remote device, which then picks up the video, as has been described earlier. This can then eliminate the problem of running wires from the cameras, which can be difficult in a retrofitted application.

The operator display 51, of the invention can thus display of data from remote machines, previous data taken in the machine or in other machines, external data bases, SPC charts, direct video display as described herein from cameras in the machine or sensors based thereon such as tools or part size or surface characteristics. It can also be used to train the operators using training programs on disc, maintenance and diagnostic features of the intelligent machine tool.

It is noted that the invention can control the amount of material added to a part, whereby the part surface is monitored during the process to assure the proper amount of added material is present in a given location (be ore shutting off the source of added material). A means of adding materials is by vapour deposition, ballistic particle or other means. Such material addition was discussed in reference 10.

FIG. 1 illustrates, the use of a device, such as ballistic particle projector 90 to direct material at the surface of a part being rotated on the lathe of FIG. 1. It is shown mounted to the cross slide of the machine and able to move in and out in the x or radial direction along with the turret, and in fact could be turret mounted. Control of standoff, or distance from the part is one of the control modes determined by the sensor feed back disclosed.

Here, the goal is to add material, and not remove it. But the same type of sensing approach as disclosed elsewhere in this case, and in my co-pending applications, can be used to sense the addition of the material as well, and to control the point at which the material addition is reduced or turned off, when the size, or other characteristic of the surface to be produced on the object to which material is being added is correct.

There are clearly many applications for a material addition process. One of which is to bring a part up to size. If one is dealing with arbitrary incoming parts, one can first pre-scan the part, or measure it, using sensors of the invention for example, at an instant point, determine the amount of material that is to be added, and them either add that material in a second pass, calculated from the data from the measurement cycle, or add it while real time monitoring takes place.

This material can be of the same type of material as the base portion of the part, or it could be a coat, or other advantageous type of material to be added thereto. One example of the latter is a ceramic coating, added to a bearing surface of a part, in order to create a ceramic bearing journal of high wearing properties, and high heat properties. It's clear that the control of such condition can be both from the point of view of size, and finish.

As disclosed it is useful to scan the material adding device back and forward, under sensory control in order to lay down a smooth coating. For example, if the coating is becoming excessively rough, the scanning speed could be increased in order to spread the coating more, albeit requiring more sweeps back and forward in order to build up the coating to the size desired (in this case, for example, a diameter size). This concept of high need non-contact sensing to control a material addition process was first disclosed in the co-pending reference B.

Finally, it should be noted that the physical masters shown in FIG. 1 have been described previously for use in calibrating the machine. The sensor is moved to a certain position, master data sensed, and any sort of correction between the actual master sensed and the machine encoder delineation of position is corrected in the machine. This then, can account for the growth of the machine due to thermal and other deleterious characteristics.

However, it should be noted that the physical master as well, can be used to actually program the machine, using the sensor equipment hereon (eg part OD sensor 25). In this case, the desirable feature is to put in a master part, let us say one typically of the type that would be manufactured in this machine. The proposed master part is then scanned by the optical sensor, under a program which allows it to come in from a larger radius position, and acquire the position so as to avoid crashes, and thereby essentially digitize the part to be made. At this point then, this is treated as the nominal part, but any dimensional tolerances, etc. desired can be added by the operator, or a software program. This is an alternative to programming the machine from numerical control generation. It also is applicable to other operations, such as the scanning of parts to be welded, in order to program robots where to go.

Note that in a sensor equipped machine tool or other machine with force sensors, that one can learn from the force or tool shape history (or Part History) and predict the next setting of the sensor to use, or predict the next part or tool condition.

In operation using a force sensor alone, for example, one would start with the most sensitive setting of the force criteria for breakage determination, such as looking at the force ratio between the tangential and radial forces, for example. Then after a false trigger (ideally, but not necessarily determined by an optical tool sensor), the sensitivity for activation could be reduced. Or, even more intelligently, if the signals of individual forces both tangential and radial had been stored, and one was seen to be not indicative of the break condition on reflection, just its amplification constant say could be changed.

This ability of the invention to compare previous signals of transducers, based on analysis of actual results on the tool or part gathered by reliable sensors is a major feature of the invention.

FIG. 2

Figure 2A:
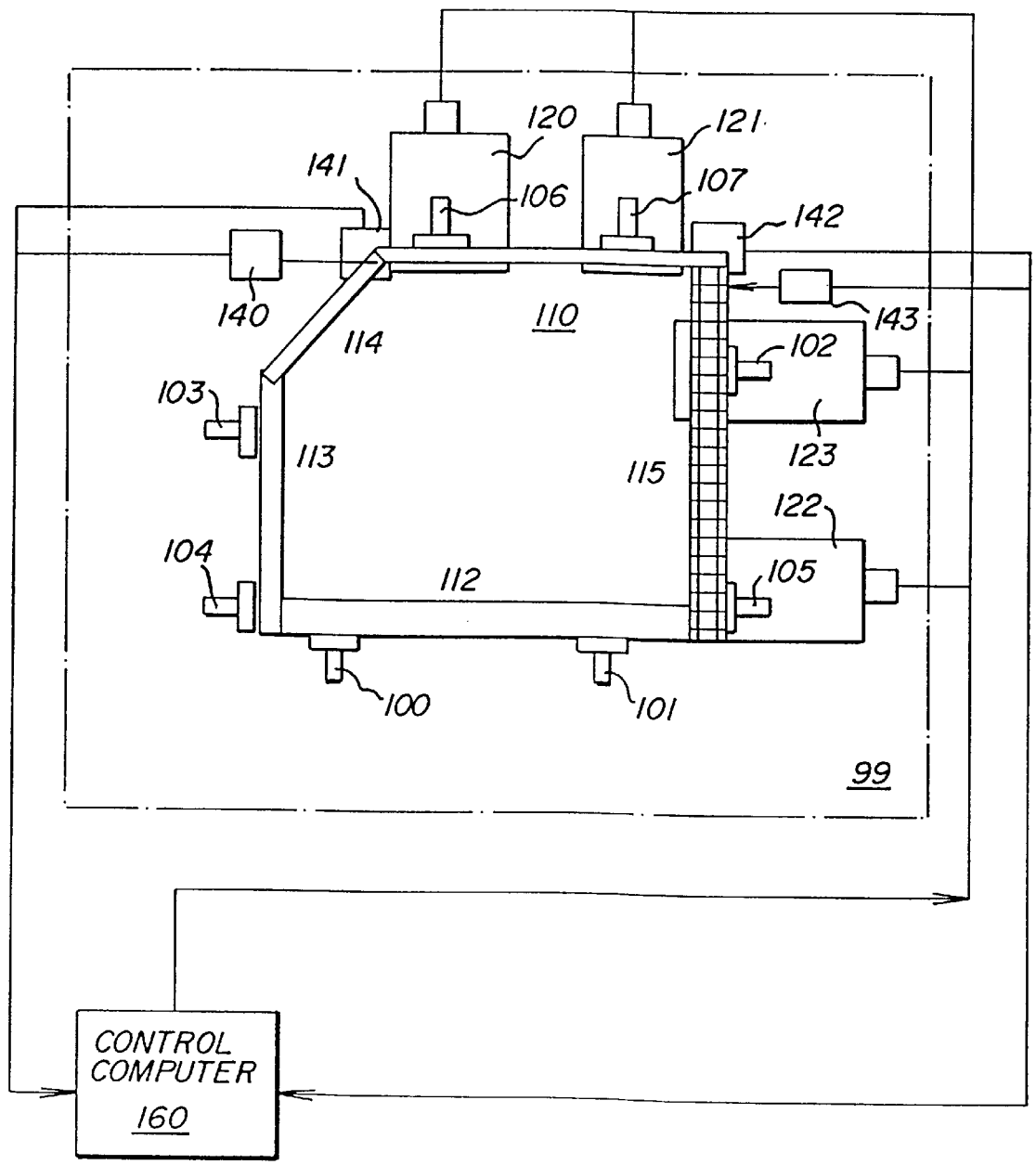

FIG. 2a shows a basic sheet metal assembly tool, 99, having 8 locator and clamping positions 100–107 to locate and weld parts of a car door inner reinforcement, whose critical surface position in the door header area 110 is monitored by sensors 140–143 such as triangulation type surface position monitoring sensors previously described in the referenced copending applications. Further types of sensors to see hole locations or edges can also be used, for example to monitor hinge holes and surfaces on other door components.

The sensor equipped sheet metal assembly tool, 99 (also called a weld tool) is of a type previously shown in Reference 7 but in this case, using more of the sensors of type 61 or 70 located in the assembly tool shown in that reference to monitor the parts within their place in the tool. Overhead located sensors, such as previously shown, can also be optionally utilized.

In this particular instance, the sensor units are monitoring key surface locations on different pieces 112–115 of a door inner reinforcement, that are to be welded together. Key points here are on what is called the door header (the area encompassing the window) and are monitored at four points in this example (by sensors 140–143), for location. If incorrect, the resultant finish welded door (after attaching this reinforcement to many other door components) can cause difficult door closures, leaks, or wind noise.

In this case, the sensor units are located in the tool to monitor key positions, and feed this data to the analysis and control computer 160. (This analysis computer can be on the spot, or it can be a portable laptop unit, brought up to take data from the tool when desired.) The sensor units in this case are range detecting to the surface of the metal, and can be simple digital point triangulation types, as disclosed in many of my previous applications.

Also shown are micropositioners 120–123 which, unlike the ones shown in the copending application 7, are in this case hydraulically actuated over short ranges, (eg +/−2 mm) but from a very stiff device. They are controlled from a separate pressure control system not shown, which is connected to the computer system 160 of the weld tool monitoring computer system, which not only takes data inputs from the sensors 140–143 of the weld tools, but may optionally and desirably in many case take data from other sensor data in other weld tools of the process, or in the checking devices used in conjunction with the process, such as check fixtures (which can be equipped with the same sensing), as well as co-ordinate measuring machines (CMM's). These devices all create a data base, related to the part, and its variations, with different functions of tool location.

A major application of this instrumented tool is to help diagnose problems. For example, a fixed welding gun on a slide, such as 130 on slide 131, was used to join two parts of a deck lid, much like the situation shown in FIG. 2 discussed herein. The fixed gun, every time it welded, was pulling one piece away from the other, and the material was sprung outward anywhere from 0.1 to 0.4 mm—which was immediately identified, through use of twin sensor systems mounted to a clamp with each sensor looking at one of the pieces to obtain a differential measurement. By adjusting the weld gun alignment and position, this pulling can be eliminated, resulting in an improved finished shape, and less stress in the part.

It should be noted that the robot controller, used to control programmable robot welding, can also be connected to this intelligent control system, and position of the robot controlled to more accurately spot weld or laser weld, as disclosed in the copending applications.

In a second stage of operation, shown in diagram 2B a robot 150 with end effector spot gun 151, each of which is also ideally monitored from the vantage point of the sensor camera 153, is guided with the help of the sensor camera 153, or at least the assurance that it goes to the correct location, and any offset thereto determined from the location of parts 157 and 158 and makes the welds accordingly. This ability to accurately guide the robot gun allows immediately a reduction in the flange widths of excess steel, put onto many panels to effect a weld. The camera sensor 159 in this case is located with in the tool itself, 155, rather than overhead as shown previously.

When the weld is made, and any distortion of the metal that has occurred in the assembly is also sensed by the sensor system 165, if desired to, for example, control better robot position, or the location of welds—choosing, for example, other locations if distortions are excessive, as well as to assure the quality of the part after welding. This can be also checked before and after the clamps are let off, and the part is transferred out. This has proven useful for diagnosis, such as 170.

The door of a car is comprised of maybe 25 pieces. All of these parts have an interaction, and the goal is to make the best possible door for a particular body to which it is to fit. In other words, data could flow from door assembly to and from the assembly operation of the body side (since the door fits in the opening of the body side) to the minor sub-assembly operations of the body side, plus data could flow back to both the door and body side tools from the body-in-white final assembly tool or cell More specifically, let us consider data flow with in the door assembly line itself, to include data taken in the tools and further using off line gage data (generally using a CMM) which is routinely taken at the end of such lines.

The data flow within the door assembly line provides for information coming to control computer 160 of the door reinforcement from not only sensors located within the tool, but sensors located at subsequent and previous tools throughout the line to which the door reinforcement is assembled into other parts. It also changes data coming from off-line, or even in-line checking devices, such as CMMs, or checking fixtures. This data is assembled with the knowledge of what is occurring in the door reinforcement tool, and in the other associated tools in the process, together with a knowledge of parts coming into the process from CMM data, or sensed data in the tools, picking up data from the press shop.

This data is amalgamated then, and used to make intelligent decisions in the instant door reinforcement weld tool, concerning the locations of parts, and the positionable locators optically varied to assure optimal locations, using for example, tool locator micro positioners (hydraulic in this case) and the exchange of data with additional measuring devices in the assembly process. Illustrated is data base creation and access by other areas of the process, as well as diagnostics made possible through its use (e.g. gun line up). The sensor data can be used to control the positioning of the NC block locators over relatively small corrective moves (eg 2 mm), or larger if desired.

The data therefore from all the various sources that are influenced by, and can influence the operation of the door tool is amalgamated as desired in control computer 160, which then makes the decision whether to accept, or reject the part in the crudest sense (allowing for a "zero defects" to be passed on to further processes), and varies the settings of the positionable locators, as well as any robot, or other flexibility positionably weld guns in the process to create the best possible door reinforcement, which can fit with the rest of the parts in the system. Where fixed guns are concerned, clearly no immediate change in their position could be made, but an operator alerts and diagnostic information are presented, and if substantially deviant and actual alarms can sound to get assistance.

Because these processes are typically based on large numbers of parts, it is usually of interest to make no rash moves, but to slowly change some of the operating parameters in order to continually work toward the best fitting solutions for the parts at hand. This includes not just in the tool proper, but in all of the connecting operations.

The actual knowledge of what causes the best possible operation can sometimes be obtained best through the use of simple rules at each tool, in conjunction with incoming data from the other tools. Usable is a parallel inference machine, such as the PIM provided by Flavors Technology, Amherst N.H. operating on the "Chaos" principle, to provide such optimized operation at the lowest software costs in terms of code generation and debugging.

In the simplest case however, the operator just simply looks at a data screen, and determines, within limits, the parts are being made successfully. If unusual events are occurring, which requires attention, these are flagged. In all cases, the creation of data bases that can be used both by the intelligent control computer 160, or for presentation to the operator is desirable.

Intelligence in the Sheet Metal Fabrication Process and Other Processes

Over the last 20 years, numerous artificial intelligence systems and processing methods have been proposed for dealing with the problem of controlling operations in a production environment. One of these is the Expert System, in which the knowledge of experts in the factory is placed into a knowledge bank, and rules generated for the production of the response to given inputs from the process. An Expert System written in programming languages, such as LISP, or Prologue, then acts on this data. The most common application is quiding a manual operator through diagnostic information.

This suits in many ways the problem in the factories in both the machining and sheet metal environments, as well as others. 'Old timers' are a repository of process knowledge, and it is desired to get this knowledge into the machine.

Accordingly therefore, the inputs are generated by the sensors in this application, and the co-pending applications incorporated by reference above, can be used as inputs by an expert system, much as diagnostic data from the engine of a car is used to an expert mechanic type system in a dealership.

There is however, one major flaw with this; namely that the amount of data, and even its type, that can be created with the intelligent sensory approaches herein disclosed far exceeds that to which the 'old timer' is not even used to getting, but even equipped to assimilate.

In short, the way in which the rules are created maybe overly limiting. Take for example the case of the sheet metal weld fixture, where the sensors are located in the elemental reinforcement weld station, shown in FIG. 2a. Typically the expert toolmaker in the assembly shop only really sees data from the last operation, where the finished part is taken off and put on a check fixture, or CMM. The intermediate steps are almost never documented, or available for analysis. He really doesn't know that much about the causes of their change, although he certainly knows more than someone coming in from the outside.

Thus in operation of the invention, while an expert system is desirable to assist the new younger generation operators in these plants, it may not provide the answers required predicting the effects of changes, and the response thereto.

For example, if metal thickness changes in the press shop, the position of metal in the die, such as part 300 in die 330 in FIG. 3, similarly so does the effect of different metal formulations, which also cause different strain properties. The effect of this on the future process needs to be understood in order for the process to be adaptive to it, if there is no other alternative; that is not exchanging the metal for a more normal thickness, or metallurgical properties. The expert inputs his data as to what needs to be done in the weld tooling, and in the subsequent manufacture of other parts, and this data is called up as a rule that when spring back is detected as such and such, the rest of the line is adapted so.

However, the problem is extremely complex, in that it is not just a one for one adaptation, and is indeed a large multi-variable problem. The piece in question at the press line is welded into another piece as in FIG. 2, and there too could be variations in the other pieces, as well as variations in the way in which the weld tooling is functioning; where the locations are, how the robot has approached it, and the way in which the metal has been pulled, etc.

Then the metal goes, in its assembled form, to another station, and yet another, and another, until the final finished product that the customer sees is created, such as the door, or the body that the door fits into. There are so many variables, and so many locations that even with the best expert opinions available today, one simply can't necessarily understand where the needed adjustments are to the process in order to make the final end product as perfect as possible, given the material that is available to the process. Attempts to measure the parts at the end of line simply provide too little data, too late, but that is all the experts to date have had to work with.

Therefore an Expert System is a first step on the road to control of such lines, but is not thought, at the time of this disclosure, to be necessarily the complete solution. For example, it can be useful to employ what is commonly called a learning system, which learns from the course of normal production what the correct settings, for example, are, and the inter-relationships. Because automotive production is typically in large quantities over a reasonably long period of time, one can accumulate the amount of experience data in order to come up with these relationships.

In addition, a new field of science called 'neural networks' has been developed, and increasingly embedded in hardware that can rapidly perform some of this learning process. While these have not yet reached the factory floor, they show promise of being the type of equipment that could solve some of these problems. For example, a method would be as follows.

Let us take a door line that is to fit a nominal dimension opening in the side of the car body. For the moment we will assume that the body opening is constant, and itself not a variable. This is basically how a door vendor would have to view it anyway, since his door as finished, has to fall within a tolerence specification by the end customer.

A certain period of the time, the door is known to be produced in a satisfactory way. This doesn't help much during the launch process. One has to get past that initial launch period, where things are often wrong such as die problems, weld fixture problems, etc. But if one has running data of what 'good' is, then one can begin to learn the effect of the perturbations in the process.

For example, one could very slightly increase the metal thickness in the die. Not enough to cause any sort of damage to the die, or other problems, but just enough to cause some change. This change then would be tracked by the sensors of the invention at all points, and the effects noted, and the neural net would learn the effects of the change. Similarly, and much easier to accomplish individual movable locators as disclosed herein, or other co-pending applications can be utilized to move one locator at a time, and the effects of that chart.

In the beginning, one doesn't even need the neural nets to respond. One can actually simply do this from a human point of view, studying the data that has accumulated in the computers to each of the tools and locations, in order to see what is going on. However, in the end a self learning capability, whether provided by neural nets, or some other method in the intelligence art is desirable. Once the various perturbations of the process are learned, then future operations of the line can be more easily interpreted, and corrections made.

For example, if one sees that the metal is out of position in the final location of a door header by 0.5 mm (a relatively large change), one can, through the learning process undergone before, understand that this could be caused by metal variation metal position changes at tool #3 at location 4 or 6. Assuming sensor locations were at those locations, this data could be queried, and the process brought back into control by moving those locations somewhat, or other locations even that interact with them. It may not be location data either, it could be forces. If it is excessive force that is located at one location, or another in order to clamp the parts into place for example, this then can cause spring back at later locations. So can be a combination of force and position sensing data.

The Expert System approach to the control of the lines is useful, and serves a real purpose of incorporating the knowledge of people who have worked in these areas for their life times in not only diagnosis faults, the traditional expert system application, but in this time predicting the effects of changes, and the response thereto.

Another key function of the invention is to provide for the creation of data bases that can be used for the storing of such data, as just described, not only for diagnosis of problems and the optimization of the process at any point, or in its entirety, but also to act as references for future products that are to be made in a similar manner, where the data from the past can be used as a guide to the initial tooling construction, material choices, robot programs and other characteristics.

For example, in a particular weld assembly tool, the data can be taken as to the robot positions with respect to the parts over a long period of time. If it is found that the positions can be held within a number far tighter than the tolerances, then the future systems can have the tolerances reduced with the width of the weld flange, for example. With the monitoring in place, if something is out of position one can either correct the robot (which requires connection to the robot's control), or simply shut it down and in the unlikely event that after such data is known that it goes out of position.

Other data can pertain to the actual forming characteristics of the metal. For example, one can collect data as to the effects of different metallurgical formulations, as well as the die construction associated therewith (to produce a finished part of a given draw dimension, or what have you), and over time determine the process viability of this particular combination, and what improvements should be made in the next die to be made, or the next part, for the next model change, these changes can be incorporated and the materials changed to optimize the production of that particular type of piece.

In addition, one can cross compare data from the different tools, as more or less implied above. For example, if a die can be made more easily at less cost, however resulting in slightly more spring back, even with optimal metal choice, this may be accounted for in a subsequent weld tool if such data is known by a redesign of the way in which the part is held, or welded. Only with such data available, using the sensory capabilities of the invention and data capabilities of the invention, can one do this.

Figure 3A:
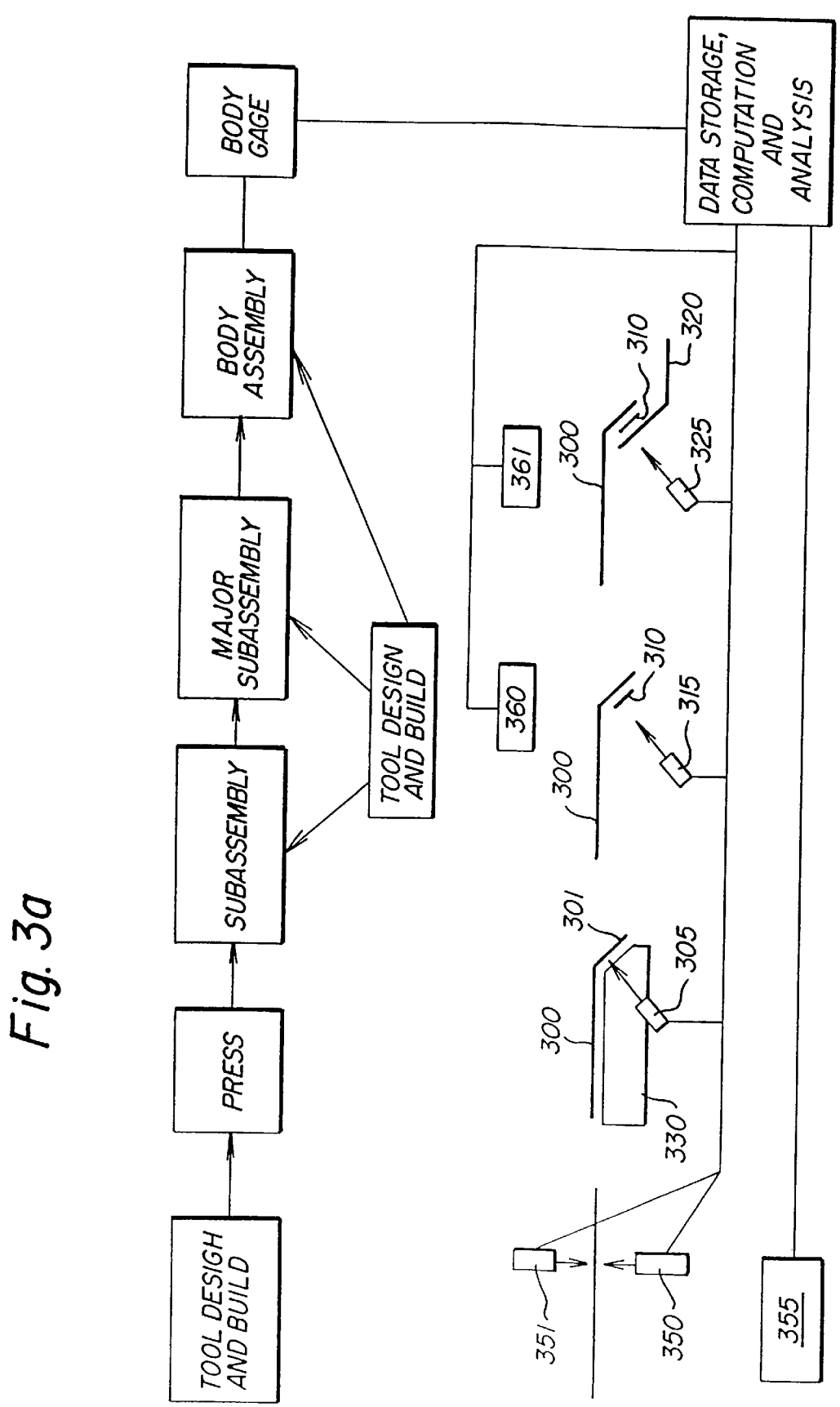
FIG. 3a is an illustration of data and intelligence used for control of operations in a sheet metal body process, in a spatial sense.
Figure 3B:
FIG. 3b is an illustration of data and intelligence used for control of operations in a sheet metal body process in a temporal sense.

FIGS. 3a and 3b

FIGS. 3a and 3b is an illustration of data and intelligence used for control of operations in a sheet metal body process, in both a spatial and temporal sense.

FIG. 3a illustrates the amalgamation of such sensor based tools as the one shown in FIG. 2, and in the previous co-pending applications into a data structure for manufacturing. While the illustration is here directed at the sheet metal fabrication and assembly operations, the general structure holds true for other aspects of manufacturing as well.

In essence, we are disclosing here a data structure that is both extensive in space and time. In space, the structure can extend (in the case of sheet metal assembly) from the sensor data taken in the press line; for example using a holding fixture resembling the tool of FIG. 2; specifically placed between press elements to take data on an intermediate portion of a transfer pressing operation, or at the end of the line for the pressed element in its final form. The second area then is from off-line data sources in the press shop, such as a CMM shown, or a checking fixture, which is desirably equipped with the sensors here shown, in which even more desirably can be made in a light weight fashion, capable of being used as well as the CMM holding fixture. For such purposes, the checking tool looks like that of the figure, but with no welding, or other attachments, simply the locating, clamping and sensing, comprising the check fixture.

Sensors of the type shown in FIGS. 2a or b can also be located in the die to determine metal surface location (including spring back after pressing)—a function of die wear, metal thickness, dealignment, part location in the die, etc. For example ranging sensor, such as triangulation type 305 is used to monitor the flange 301 of part 300 after forming in a die. The same area can be monitored at later points in the process, during assembly, for example by sensor 315 when part 310 is added to part 300, and by sensor 325, when part 320 is added.

For maximum benefit in understanding material properties, the data from the above sensors used after forming and after joining to determine distortion and springback, should be combined with data on the metal thickness, for example taken with differential optical triangulaton sensors or other suitable surface or thickness determining sensors 350 and 351 on the metal going into the press, and with metalugical properties from a suitable database 355 provided by the steel vendor, or laboratory. Welding Data (eg. current, time, etc) from welding controllers 360 and 361, or other process variables can also be linked to the part location or force data obtained by the sensors of the invention.

The press shop is often located either distant spatially, or the parts produced with different dies at different times. The parts then go to the assembly operations. Here the smallest parts are made into the elemental sub-assemblies, which are then further assembled into other assemblies, and finally the major sub-assemblies, which themselves are then finally welded to form the body of the car.

At each stage, the invention contemplates both sensing within the tools, as shown in FIG. 2, and sensing at the end of the line, or intermediate parts in coordinate measuring machines, checking fixtures, or any other devices. These are in a preferred embodiment of the invention all linked on a network according to a dimensional control plan, which is generated, and can even be simulated for the process in question.

Simulation, for example, can include the perturbation of the process in a model to show what dimensions are likely to vary, and these become the locations for the in-tool sensors. In other words, sensing in the tool using critical tool space is reserved for those most critical points known to cause difficulty of further operations, or to be used for critically monitoring in-coming parts, or to monitor a difficult operation.

The second regime of the invention is time—from the first prototypes, to the pre-production pilots, to the production pilots, and then to the final process. In this case, it is desired to have the sensing regime in place across this time spectrum, and to be developed in conjunction with sensors even in the pilot tools, so that one can start logging sensor data early. This has been discussed in some of the co-pending applications in some detail and is further elaborated on here to operate in present conventional practice, as well as futuristic positionable devices. Such a time sequence is shown in the figure.

It is noted that a system, such as that shown, with all the assembly tool operations, for sub-assemblies which may comprise sub-assemblies, etc. and the major assemblies on the body can be controlled, either in part, or as a totality through a parallel inference machine, such as the PIM of Flavors Technology in Amherst N.H. In this case, simple rules of each operation are set up, both for that operation, or for the operation of the group of operations (i.e. all subassemblies for example, including mating parts) are set up. Such rules could be "if the part is located more than 0.2 mm from nominal", move the locator at that location by the amount in the opposite direction. However, a second rule influencing the operation would be if previous moves of such locator to the location then predicted causes deviations of more than at a further location, move only a portion of the amount, etc.

All of these rules have to be thought out by the individual process engineer for these operations, and would probably be generated over a time period, in which the data base is gathered from the parts. This key gathering of the data base through the sensors of the invention in the tools then is a major issue.

Figure 4A:
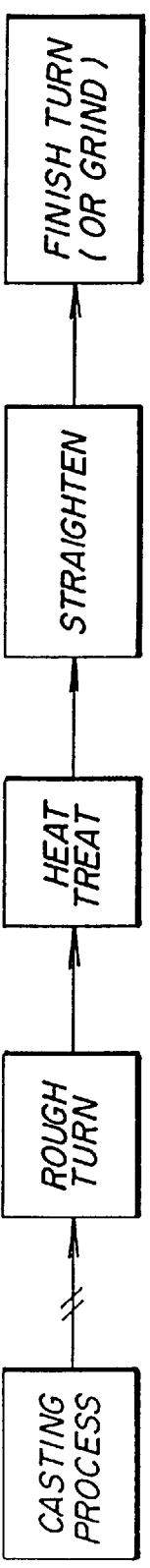
FIG. 4a illustrates an old process for automotive shaft production.
Figure 4B:
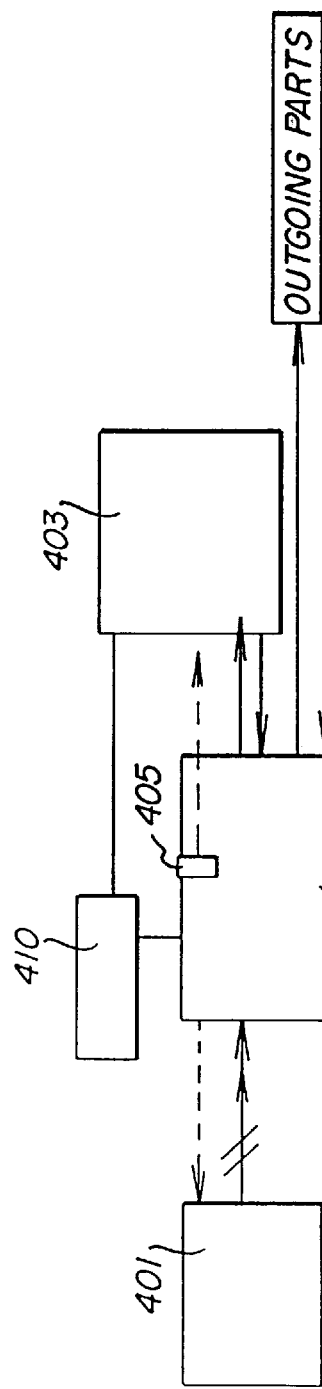
FIG. 4b illustrates exchange of data in different related processes used to control a part making process including a machine tool in an integrated Casting, Heat treat and Turning system of the invention.

FIGS. 4a and 4b

FIG. 4a illustrates an old process for automobile shaft production.

FIG. 4b illustrates an embodiment of the invention, also relating to the collection of data between the process steps. However in this case, rather than the process being different stages of welding for example, it is desired to control completely different processes that are however, all used in order to produce the final product. In this example, we are concerned with the control of casting, machining, heat treating, and potentially straightening, as a result of sensed data taken primarily, but not necessarily limited to, sensors in the machining operation.

Here again, it is the connection of sensing data, particularly of the dimension or location of the part, that is then used to control any or all of the group of processes. In the example here, sensing in one location, the machine tool, can be used to control the associated processes for maximum economy of scale. Again though, sensors can be used in all areas desirably just as shown in the above FIGS. 3a and 3b.

By way of illustration, the typical operation in making an automotive output shaft today, which is a part costing approximately $8, and having a precision ground, or hard turned journal surface of approximately 20 microns total tolerance, as well as splines at the end of the shaft with grooves in them. This shaft is used for transmission of power between the transmission and wheels on the front drive car.

This shaft is made by forging, or as illustrated in this case, casting (the feedback mechanisms described herein apply to all molding or forming processes), which are then generally remotely located from the final operations of machining, heat treating, straightening, and re-machining to final size. There are also the additional operations of spline rolling included.

Today, no data is typically returned to the casting process from any of the other operations. The casting vendor simply tries to make the castings, with at least 3 mm of stock oversize on them so that the machining can remove stock with never having too little, which would otherwise create a surface that "doesn't clean up", and leaves holes in the critical surfaces. Unfortunately many times the casting process can leave too much material there, which can damage tools, and cause other problems on the finished part due to the increased forces needed to take large depths of cut, and the like. Clearly the more excess stock that has to be removed, the higher the cost of the subsequent machining processes.

Because of the fact that the heat treating hardens the surfaces, as well as distorts it, the part has to be straightened and then machined again, using typically grinding, but in recent days hard turning with ceramic tools. The heat treat process distortion is itself a major problem area. It is noted that a 0.001" error in amount ground off can cause the case hardened layer to be insufficient, and premature failure to occur. Such an error can easily occur with a "Dumb" CNC or dedicated machine trying to machine a distorted part in a preprogrammed manner.

A goal of this invention is to both optimize, using sensing in a single machining station to better optimize both the casting process producing the incoming parts to the station, and the heat treat process acting on the rough turned parts, and producing the incoming parts to the finished turning operation in the station. This is all illustrated in the new intelligent process step.

The casting process, as now 401, sends parts to the turning machine (NC lathe 402), which then turns out parts that are heat treated in a heat treat process 403, and returned to a lathe 402 for final finished turning. Normally this would not be terribly practical, since there would be substantial differences between the lathe used to take heavy rough cuts on the soft casting, and that used to take fine finished cuts on the hardened material, using ceramic tools. However, in the invention disclosed here, where the casting process can be optimal to reduce the amount of stock that has to be removed, the same machine can be now economically used, simply by changing the tool within, and the speeds and feeds of the machine. This not only saves capital costs, but has the further advantage from control purposes as here described. Sensor(s) in machine such as 405, are used to check incoming castings, rough machined parts to heat treat, incoming parts from heat treat, and finished parts leaving the system. Control of heat treat provided by process model continually refined by data taken in the sensor equipped machine tool othe invention, to makestraightening not required, and finish operations after heat treat minimized.

The Casting process is optimized using data on parts provided to machine tool, to include steps of reducing casting excess stock to minimum possible for adequate clean up in machine at acceptable scrap levels, and the optimization of core shapes, and mold shapes to produce parts which upon scanning of multiple data positions on the part in the machine tool, yield the best performance both in the machine tool and/or for heat treat purposes.

The machine tool 402 is equipped with a sensor, particularly suited for measuring the part surface location, such as 25 of FIG. 1. While it is clear that we are decribing a turning process example here, the same arguments would hold for sensing the surface of milled parts, in a milling operation, or sensing in a more general sense other parts in other types of processes.

In this case, the intelligence controller 410 takes the data from the sensor 405, and uses it to figure out to determine if the incoming casting on a pre-scan of the part is satisfactory for further machining, and if so what should the settings of the machine tool be. This sensed data is sent back to the casting process, either directly by wire, or in batch mode, to allow the casting plant to continually optimize the process to create the lowest possible amount of excess stock without creating too many rejects; that is parts with too little stock. If too little stock comes in, the part is instantly rejected, and it is clear that with the sensing system 405 built-in, one can deal with, and thus tolerate, an occassional reject, therefore allowing the casting process to run as close as possible to "near net" shape.

On a feed forward basis, the sensor 405 is used to sense the diameter and the straightness of the rough turned part, which is then feed to the heat treat operation 403. After heat treating is done, the part is then brought back to the machine, and remeasured again by sensor 405. (clearly it could be taken as well to anothr machine similarly equipped).

Clearly, any sort of distortion in the part due to heat treat is immediately measured by the sensor, and used to optimally control the machining cycle for the remaining finish machining of the part.

Additionally, a goal is to reduce the amount of heat treat distortion, both to eliminate the need for an additional straightening process (achieved by literally hammering the part at rotational positions), and as well to simply eliminate the amount of extra machining, and difficulty caused after heat treat. Indeed, under absolutely optimum conditions of control, one could actually finish machine the parts pre-heat treat, and that would be the end of it, since no heat treat distortion would occur. However, this is very difficult to accomplish, and what may be the best approach in the near term is to simply optimally control the heat treat process. This process can be optimally controlled by feeding the data concerning the part size and/or shape to the heat treat, determining what has happened in the heat treat process to the part size and/or shape, and then modifying the heat treat cycle for example by preferentially heat variable areas of the part in order to optimally home in on the best possible regime that creates the least distortion, while still achieving the satisfactory case depth.

The parts are then shipped to the using assembly plant, and typically that is the end of the story. However, data can also be brought back from the assembly operations, where the parts are used with other parts. If there are any difficulties, it is desirable to change the dimension to better match, let us say errant dimensions from other parts, these can be fed back to the machine as well.

FIG. 5

Control of Part Size in High Production Machining Operations

Size Control in Turning

Control of size in turning operations is a different issue than grinding, where material is taken off the whole surface at once, and one just keeps grinding until the correct diameter is reached- an example of real time control but at a relatively slow frequency response. For one thing, turning removes a small amount of material per rev (equal to the feed rate in axial chip width) and the frequency of rotation must be correspondingly higher. The instant force is lower, but in three axes.

There is a question where axially to monitor the part, whether or not the diameter need be monitored (or just a radius), and whether the process, being more repeatable than grinding, can use post process techniques only to correct it. These issues can vary as well depending on whether it is a rough or finish cut. For example, for finish cuts, one may not find it practical to cut, then read, and recut to final size, as it is difficult to take very small depths of cut.

For finish cuts, there are five control modes to consider (all of which have novel aspects discovered. These are in addition to the common technique of measuring part dimensions and "offsetting" the tool location for subsequent parts based thereon (via SPC, control limits etc).

1. Control of the tool and correction of machining parameters for the next part.

For stable processes this is an acceptable and inexpensive solution, which avoids the requirement to frequently gage parts. Control is achieved via prediction of size and finish from tool shape and location. However this measurement is often taken remote from the actual cutting point.

2. Positioning the tool in the X (radial) direction for the instant part under local tool sensor control, then cutting a preprogrammed path with the sensor off (eg. a straight Z axis move in the case of the hard turned journal).

This uses a sensor to see the tool just before cutting and in the cut location, but can use the same sensor to check the work, and derive in alearning mode any small offsets (eg due to tool deflection), on the next part.

3. A variant on 2 in which a first cut is taken on the part at a diameter less than the final diameter with the sensor on, the tool position moved to the predicted final location, and the preprogrammed cut made.

In a dynamic variant of this the part size is monitored while the tool is moved to increase dimension (unlike grinding, which decreases dimension while size is monitored), until the desired part dimension desired is reached 4. A method alluded to above, and similar to 3, where a trial cut is made along the whole surface to be cut, the cut surface measured by sensors in-machine, and a final cut taken with the preprogrammed path varied as needed. This can further includes a state whereby the final tool position is over or under corrected due to a learned effect on tool deflection caused by different cut depth levels required to cut to final size levels (note tool force could be monitored and also used to learn this correction).

Rapid sensing of a trial cut model, or a portion of the same part just a different location than the finish desired portion.

5. "Millisecond" response real time control in which the part radius or diameter is monitored dynamically, and the tool moved accordingly.

This can be to correct within a rev, as in out of round, or more likely, to drive the tool toward the mean value. It is noted though that some initial area of cut has to be taken which accordingly may be different than the rest—eg the point of 3 above.

With respect to the error sources mentioned, all approaches can account for thermal error of the machine, with the versions 2–5 removing it entirely.

All approaches can remove tool setting error and error due to tool wear. However, those techniques which can accurately monitor part size, may be more accurate than those which just use tool wear and position data. (but size trends can be learned and corrected in conjunction with tool data)

Tool deflection error, and part thermal error are generally corrected only by those techniques monitoring the part. Problems caused by variations in Part hardness can be solved by techniques 4 and 5.

All Methods except 5 above can use non-contact sensors in the presence of coolant—assuming suitable shutters or other measures are available to protect the sensor windows from contamination. Method 4 also requires the part to be cleared of coolant film to the accuracy required.

Now disclosed in detail are above methods 2 and 3 for turning parts which are more accurate than in conventional practice The invention therefore, as here disclosed, is aimed at metal cutting to produce very close size control, even in high production applications of commodity items such as automotive parts.

FIG. 5

Figure 5:
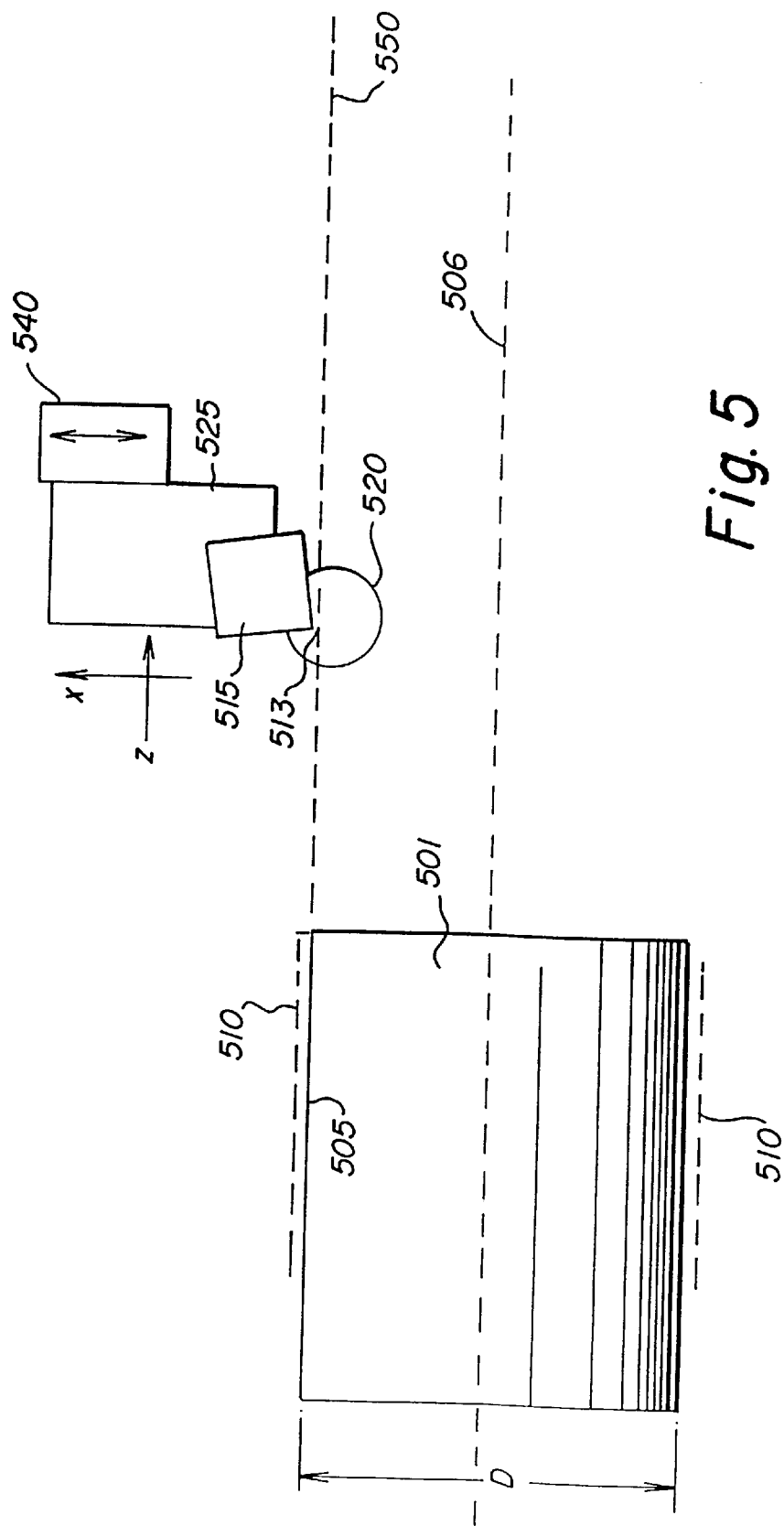
FIG. 5 is an embodiment to produce improved accuracy turned surfaces.
Figure 6:
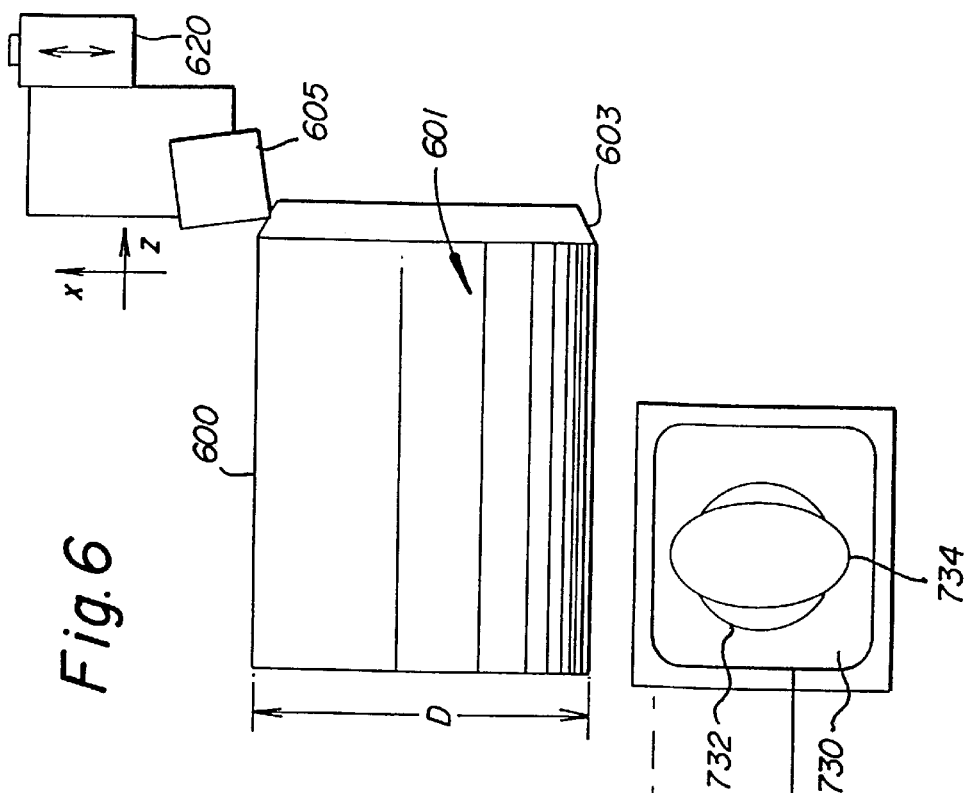
FIG. 6 is an additional embodiment to produce improved accuracy turned surfaces.

FIG. 5 illustrates the turning of a part 501 to an accurate diameter D. The goal is to cut surface 505 at the correct radial value from the center line of 501 during its rotation, such that D will be optimal, and as accurate as possible within the confines of the spindle bearings of the machine. The question is how to do this?

One would like to cut this diameter to accuracies better than 0.0001" (2.5 microns). This is however, extremely difficult in normal lathes, because of the thermal growth of the machine, and particularly the turret and cross line. In addition to thermal growth, there is tool wear that also can easily exceed these requirements. The combination of thermal growth and tool wear therefore means that a "dumb" CNC machine, programming a tool to go to a certain assumed location can easily be off by as much as 0.001". In other words, as much as 10× the goal here sought.

A first method according to the invention, which can take out many of the error sources involved is to utilize a camera system of the invention, fully disclosed in the co-pending applications, whose field of view is approximated by the circle 520, realizing that the field of view may be more largely described as a square, to suit the matrix camera often used to sensed the edge 513 of tool 515. This tool is typically mounted to some sort of positioning mechanism 540, be it a turret, or a micropositioner, such as Samsomatic hydraulic unit that is capable of moving in and out in the x direction. It's realized that while the field of view 520, as shown, is relatively large, in practice it may be only 0.2" square.

In the particular mode of operation, the camera system is attached to the machine in such a manner as to be fixed in its location at any given point of checking, relative to the axes of location 506 of the part. In this way, the camera system then, can act as the final arbiter of determination of tool location with respect to the desired point of the reference axis, from which the cut is to occur. In this case therefore, the tool is moved by the x axis positioner to a point near the desired surface location 505; getting it to within 0.001, or so through the normal CNC operation.

At that point, the sensor unit, whose field of view 520 encompasses this area, looks at the end of the tool, determines the location of the cutting edge with respect to axis 506, and feeds the offsetting instruction to the microposition controller to bring the tool edge to the exact point, relative to surface 505 that is desired. When that point is reached, however noting that it is not on the surface itself but along line 550, the tool is then moved in a z direction in a straight move, taking off the stock representative by line 510, and leaving the desired surface 505. The machine movement in the z axis along the line 550 extending from the surface 505, and is assumed to be accurate enough without undue undulations, so as to make the cut as desired.

It should be noted that this mode of operation, as shown in FIG. 5, does not depend on having the sensor unit 520 operational, during actual cutting and in the presense of any coolant used. A suitable shutter can be used to shield this sensor during this period from both chips and coolant if desired. It is also noted that the sensor is not exactly right at the point of cutting, although it is clearly desirable that the sensor be located close to the part as possible in the Z axis, such that the amount of movement can be minimized to obviate differences due to thermals that might change in that direction.

Because the optical system can easily stand-off the part, it is often possible to get the tool edge sensing actually located to within a fraction of an inch of the edge of the part to be machined.

As can be seen, since it requires a fixed field of view sensor, with respect to the spindle axis, it is typically easiest to implement this aspect of the invention for high production parts, which are always made to the same diameters, or nearly so within the tool sensor's ability to sense, without itself being physically movable (adding error and cost).

FIG. 6

The question posed, is how to cut the surface 600 of cylindrical part of rotation 601, at a "perfect" distance D/2, from the rotation axis, such that the part could be produced to a desired diameter D, as effectively as if it had been ground (or even better)?

Clearly the tool has to enter the surface, and precisely start the cut at the distance D/2. Disclosed as a means to do this, is to begin to cut a chamfer 603 on the part surface 600, using the tool 605, and measure the part 180° out of position with the tool at a known distance D/2 from the part centerline, as disclosed in FIG. 5 or otherwise. Or even better, to measure the true diameter D at an rotational position, with respect to the tool, such as 90° shown, such that any deflections of the tool or part or their characteristics, be removed. As the tool is fed in the z direction, and begins to remove the material the diameter is measured and the tool is moved outward in the x direction, until the diameter D equals the desired diameter. At that point the x axis motion is stopped, and a cut made in the z direction along the axis at the same x location as the proper D dimension had been determined.

Since the diameter D (or alternatively and often less desirably the radius D/2 from the nominal spindle centerline) can be measured to very high precision (e.g. 0.5 micron) in the machine, grinding tolerances can be achieved. However, I have found that many lathes are not now equipped with the resolution in their x axis slideways to accomplish this to let us say, an accuracy of 1–2 microns, which is a desired type of precision. In this case, it is possible to have a micro actuated tool, with micro actuator 620 to move the tool up and down with respect to a turret or other machine portion (not shown) leaving the x axis motion of the machine, fixed during this precise operation. This means that the error in the machine ways, which can accrue over time, as well as other problems of the machine, do not enter. The machine function then is only to position the tool at an approximate location so that the final motion can be within range of system 620, which can operate with stepper motor screws, or hydraulics, or other techniques known in the art for precise movement of the tool, in a rigid manner.

The measurement of diameter D is best made by non-contact camera means, which can see the chamfer zone in 2 axes (z and x), so that the precise point of material removal can be discerned when the x axis motion should be stopped. However, other non-contact and contact type sensors can also be used.

The system functions will with no coolant to cause problems with the determination of diameter D. The chips and other material removed, particularly in a high precision finished cut, as is controlled in this case, are relatively small and do not interfere with the function of the optical system.

However, the system can even operate in the presence of coolant, because it is not necessary to have coolant on through the whole procedure. Indeed, one can make the first small cut of the chamfer, (or other zone which is not important to the function of the diameter, or other shape), without the coolant on, in order that the optical sensor can easily function. Then, when the correct dimension D has been reached, the sensor can be removed or shuttered so as to be not affected by the coolant, and the coolant turned on so that the tool can make its main pass down the axis of the part, which does not require the dynamic action of the sensor. Then upon finishing, the same sensor unit can be used to inspect. This is particularly easy if the sensor unit is mounted to the same turret slide in the z direction, but independent of the x axis motion. This means then that the z axis movement of the machine can scan the sensor along the part to inspect it if desired.

To effect highly accurate movement of the tool (eg. to 0.5 microns) a micro positioner on the tool may be required, in which the turret positions the tool and positoner at a nominal value of X, and the micropositioner postions the tool the last amount needed to perfectly machine the chape or size desired. The positioner can be stepper motor driven, or hydraulic to expand say a diaphragm, pushing the tool downward slightly.

The micropositioner can also be used under command of the system control 49 to produce various finishes on the part surface. For example it can be fed random oscillations in z to produce a random feed superposed on the turning provided by the normal machine operation, lessening the "Screw Thread Effect" common in turning. By monitoring the surface finish using a surface finish sensor one can Machine until desired randomness generated, or other desired surface finish lay characteristic. Marks are clearly further randomized, if the tool is oscillated in the x direction as well (but over a very small range, as x determines the desired Diameter).

FIG. 7

Figure 7:
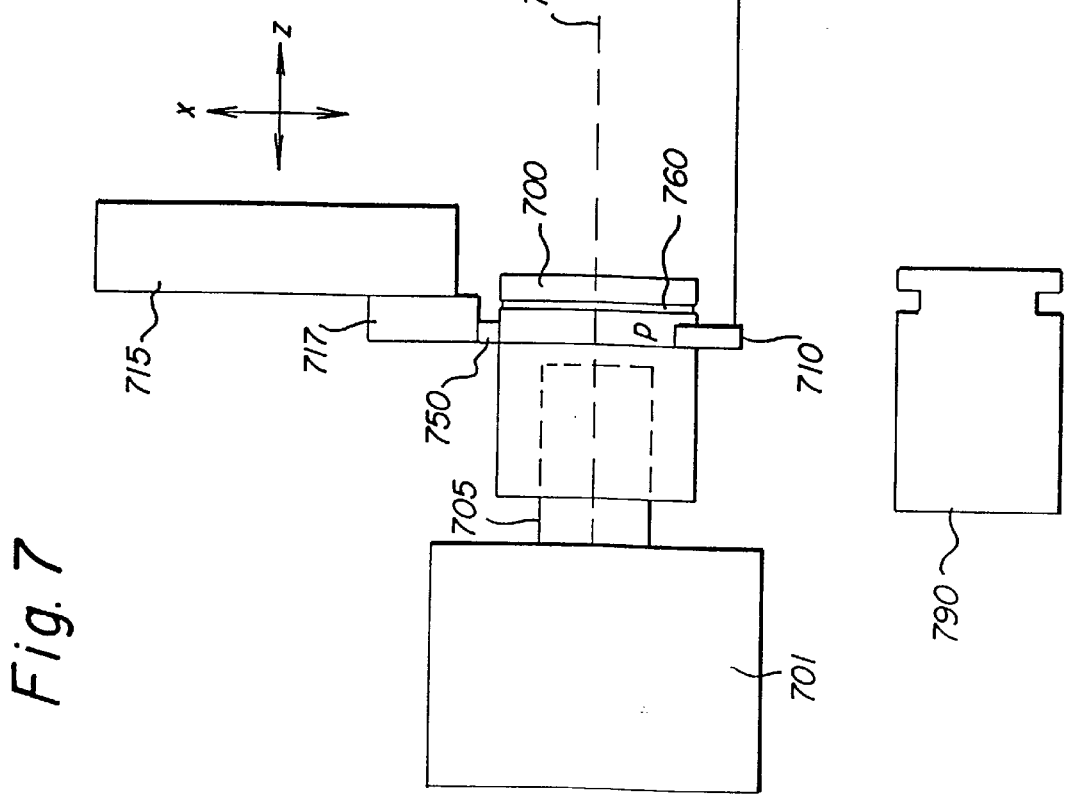
FIG. 7 is a diagram of an embodiment to deal with deformation of material during working.

FIG. 7 is a diagram of an embodiment to deal with deformation of material during working such as turbine blades on blisks which can deflect and vibrate while end milled, and sheet metal parts which deflect under the forces of clamping or welding from their desired state. In each case sensing is desired to detect the degree of undesirable deflection and reduce or eliminate the effect during working and/or intelligently predict the settings for the machine or choice of tool for subsequent operations.

The detection is accomplished by detection of tool or object reaction force or accelerations due to fluctuations, or by direct measure of deflection of the part with respect to the machine. Vibratory deflections cause unwanted "chatter" on the surface of the part, and can often be corrected by changing the tool feed or speed, or the tool itself. Quasi-static cutting force deflections cause unwanted changes in size. This later case will now be further illustrated.

The case of piston OD turning is very illustrative to the benefits of automatically learning the part distortion characteristics, using the high speed measuring and multi-sensor capabilities of the invention. For example, the piston 700 is turned at over 4000 rpm by spindle 701, which results in a centrifugal effect, distorting it in different circumferential directions, due to the asymmetric internal composition of the piston. Because of this, one needs to "learn" what this distortion is, and in the particular case, one can simply run, let us say, 50 pistons of a given batch, and spin them up to speed, let us say for 4 or 5, or even 6,000 rpm, and determine their out-of-round function of the velocity and their circumferential location, using for example electro-optical sensor 710 connected to the machine z axis and movable axially to track the tool. This then can be plotted as shown on computer display 730, and used to then compensate the position of tools that are used to machine the pistons. This can be done with every piston batch, or it can even be done individually for a given single piston, simply by taking the time to make the measurement, which may be very sure. In order to do it, we make a measurement of the piston run-out, as a function of position before spinning it up to speed, and then as it spins it up to speed. It is felt that by doing this, higher piston turning speeds can be achieved, since the effects increase as the square of velocity, and these can be accounted for with the invention. This translates into more parts per hour.

As the piston is first located on this type of an arbor 705, which is typically expanding the optical sensor system, typically employing an emage sensing linear photo diode array checks the part run out as it comes up to speed, and determines the position once the piston is at running speed (typically 4,000 rpm) of the piston OD with respect to the centerline of the spindle 702. If excessive run out beyond some threshold is obtained, the part is deemed to be mislocated due to dirt or some other cause on the locating surfaces, or containing too much stock for good measurements, and the part is removed. Similarly if the part is simply oversized for any reason, such as being the wrong part, or too much stock from casting operation further is removed. This can also indicate that the rough turning operation preceding had not been performed or had been poorly performed.

Of great importance to the final configuration of the piston however, is the determination of the run out of the piston with respect to the dynamic centrifugal force load. This run out is a function of the bob weight effect of the piston, and is directly measured by the sensor camera operating at, let us say, 10,000 readings per second, clearly capable of measuring every degree or better (and even that is not necessarily required) on even a 6,000 rpm rotation. (see copending applications for details).

This data is fed into the computer, where algorithms based on previous experience are added to modify the NC feed, and the numerical control signals fed to the x axis actuator to allow it to move in and out to create the contour of the piston. Computer display 730 will then display the piston shape either without distortion as 732 or with distortion as 734 as exaggerated by the computer.

In wet turning, where the whole area is flooded with water to keep the piston cool, and to provide some sort of chip clean out and tool cooling, the optical sensor is essentially inoperable during this period, although it is envisioned that at relatively lighter coolant loads, that the coolant can be blown out of the way at the sensor. In this case the tool comes in, in a pre-programmed manner learned from the previous parts, both from the pre-scan data and post-scanned data, taken after the tool is complete.

Every part or every 5th part, or whatever is rational, can be checked after cutting in order to determine what is going on with the part, so as to correct the future parts. Because pistons are turned in such high volume, it takes only a half hour of operation for example in order to develop statistically quite a very good feel for what the run of pistons that day is doing from the point of view of the tool and its cutting of a particular alloy combination present that day, as well as the thermal growth of the piston itself. These intelligence factors are continually honed by the computer intelligent system, in order to further and further optimize the production. The key thing is to be able to inspect this in situ, while it is fixtured in the spindle, in order to continually have this data. The key is to do this fast, because in the piston machine every second counts.

The piston also suffers from distortion due to the cutting force, which also varies as a function of the complex internal structure and varying wall thickness. Here the measurement is made during cutting by tool 750, which for most optical or other non contact sensors such as capacitive types should be performed dry for best sensor results, even if later one would cut wet once the distortion characteristic had been learned.

The instant characteristic of the piston at a given axial point P being cut can be determined and stored as a function of rotational position. By taking data at a number of axial positions, the effect of instant distortion is mapped. Later after cutting is complete, the piston can be again measured with the sensor, and the effect of the distortion on the finished part determined. In the future, the tool position is then compensated as a function of circumferential or axial position, if required, to remove any size errors due to distortion. The initial mapping is only required if a statistical sample cannot be built up of after part machining effects.

The same procedure can hold for compensating thermal variations. The piston can be machined, for example dry, and the growth of the piston measured as a function of the machining. This can be done on test samples, by simply leaving some areas such as groove 760 unmachined, which are measured for size and change therein due to thermal growth with the sensor 710 as shown. The tool point can be varied in its position on the machined areas to compensate for this growth—etiher on the instant part or subsequent parts.

Another example of distortion control for maximum accuracy was discussed relative to FIG. 2 and the problem of component welding. Just like the piston, spring back effects occur in sheet metal which can be learned by the constant monitoring of the surfaces in question, and once learned, used to compensate the tool position, clamp pressure or the like. Material can be removed more or less from the piston surface so that after spring back the surface will be in the correct position. Similar arguments can be used for material addition processes which can change after addition.

Distortion Correction of the Machine Proper

Machines, such as machine tools, can now be made with new materials of desirable properties such as composites, with for example, improved stiffness or rigidity characteristics, which however are thermally unstable, as such effects can be compensated by the use of the invention.

Automatic Checking for Pre-working Surface Condition

The automatic measuring capabilities and learning also have other applications. For example consider the use of the machine of FIG. 1, use for hard turning bearing journals to completely finish a bearing, including super finishing of the journal. This is done, either by lapping, with let us say a built in lapping wheel in the turret or tape, or by roller burnishing in the turret.

In the case of roller burnishing, which is relatively easy to accomplish in the turret 715 by simply putting a harden precision carbide wheel on rollers in one of the turret mounts 717, there are several major problems that can be solved with the invention.

In the first case, one has to assure that the part before burnishing is absolutely clean, such that any chips or undesired residue is not rolled into the surface. The part (for example, a turned shaft) can clearly be blown off, by means that have been disclosed, and then sensed optically using the invention around its whole surface if needed be to assure that no material is present. This can be done simply by making a measurement with the camera integration used to average the image of a substatnial portion of the surface, or by making a large number of individual measurements along the length of the surface to be burnished throughout the circumferential rotation of the shaft.

If the part as now measured is not clean enough, the air blow can be used again, and the process repeated. If it is clean enough, the roller burnishing wheel can be brought in against the part, and the roller burnishing process commenced. In this case, the sensor units are used to monitor the edge of the part opposite the roller burnishing wheel, and to make sure that the conditions are correct, in terms of the diameters achieved and any deformation of the part that occurs, being within limits during the process. The finish sensor and the size sensor can also be used during the finishing process or after, and the roller burnishing can take place sequentially along the length of the shaft, of it enough forces are present all at once along the length.

The sensor units can also be used to monitor the position of the roller burnish wheel as it begins its process to allow a direct measurement of the relative position of the part to the turret, rather than using the incremental turret measurements.

Much the same would be true for lapping, or grinding in the lathe. In this case, the abrasive on the lapping or grinding wheel can be utilized to essentially again remove, rather than roll over the peaks and push them down of the surface to actually take them off. In this case, the lapping, or even a light grinding wheel can come in, and under similar control, but with a motor driving it at high speed, or at whatever speed is required to move it back and forth across the surface, or indeed the natural rotation of the turning process. perhaps coupled with a counter rotation, thereby making the effective rotation speed much higher. In this case, the abrasive should be extremely long lasting such that it doesn't have to be changed.

Relative to pistons or other asymetric objects, the invention here disclosed offers a vastly improved method of accounting for the unknown position of the surface of the piston rotationally due to the centrifugal forces tending to asymmetrical deform the piston at the 4,000 or more rpm run by the machine. It is noted that the piston, because of its internal construction is shaped much like a dumbbell internally, and this asymmetrical mass that can cause unknown positions in the OD. This in turn can cause difficulties in the programming the machine, because the amount of metal removal at any particular point on the circumference of the piston is unknown, and various piston manufacturers have developed particular trade secrets and the like with respect to prediction of this growth—a necessity which is obviated by the present invention.

The invention also solves problems of loading of the piston at high speeds onto the chuck and any sort of skewing or other misposition of the piston after loading, due to chips or other build up on the chuck, or other such problems is checked by the machine and kept from interfering with the production process.

The invention controls more perfectly the actual diameter being cut on a precision skirt dimensions by the high speed actuated tool. This is accomplished by adaptive control of the tool position, either in process or at least to control post-process for the next part.

It is noted the approach utilized herein is best suited for operation in a dry cutting environment. Where this is not possible, such sensing is done before cutting, after cutting, and influences the conditions therefore done after cutting, or relevant to both the inspection of the part for further acceptance, and added capability of the invention.

Note that a master such as 790 which does not distort, can be put in the machine and scanned to determine the accuracy of machine with a perfect part. If desired, these sensor readings can be subtracted from any actual readings to obtain only the value of the changes experienced due to thermal or other deformation.

A master with known deformation characteristics can also be used to check out the machine.

Figure 8:
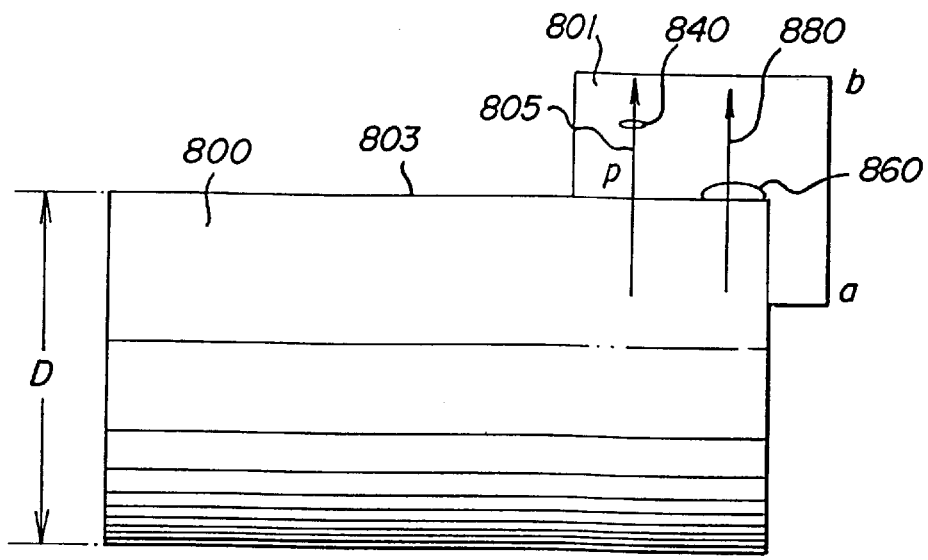
FIG. 8 is a diagram of sensor contamination protection according to the invention.
Figure 8A:
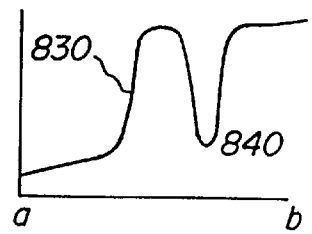
FIG. 8a is a plot of detected intensity versus pixel location for line 805 of FIG. 8.
Figure 8B:
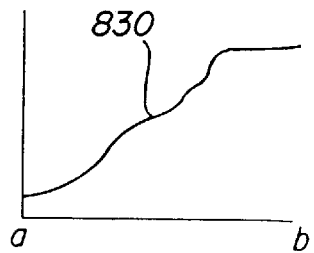
FIG. 8b is a plot of detected intensity versus pixel location for line 880 of FIG. 8.

FIGS. 8, 8a and 8b

In operation in machines, problems exist when coolant, chips or other contamination get on the sensor window, such as 801 of matrix array camera (not shown for clarity) of the type disclosed in the copending applications, used to determine the location of the image of surface 803 of part 800, in order to determine the size, location or other characteristic of the part. In this case it is desireable to read the scan of the array lines from the inside (dark) out, to light, such that the first edge transition 830 to be seen on one array scan line for example, 805, will be that of the edge of the part, and not a false edge caused by contimination such as cutting chip 840.

To be accepted, a certain degree of contrast is required in the image along a scan line, in a preferrable embodiment. If it is sufficient, the window of the sensor is assumed sufficently not-contaminated at the point, such as P on surface 803 looked at. This is the case on line 805 whose detected intensity versus pixel location from a to b in the field of view is sown in FIG. 8A, but not on line of scan 880 in FIG. 8B, whose lack of contrast is for example due to coolant 860 on the window—or the part surface. (although the part surface coolant can also cause in profile illumination such as shown, sufficent contrast such that an apparaent shift of the position of the edge of the surface can occur. Several mechanisms for dealing with this were disclosed in my U.S. Patent reference 4 above. For example, if there are one or more isolated protrusions indicative of coolant, dirt, chips, or other material on the part (or tool, or other object), a determination is made to see if sufficient data points exist for the measurement leaving out these particular locations. If so, the measurement data is declared valid.

In the case where contrast is insufficient, other readings using different scan lines are used to find edge 803 and the data from scan line of 880 is preferably disregarded. Other lines adjacent are looked at with the matrix array, and if a sufficient number of points to build up the correct description, within the tolerances desired, of the shape of the tool or part surface in the area observed is possible, then the measurement proceeds.

If however, there is not a sufficient number of data points indicative of surface location for the purpose at hand, that have sufficient contrast, than a blow-off or other attempt to clean the window, or the part edge, is undertaken.

One other method of determining acceptable measurements is to use a plurality of surface data points, and determine not only size, but contour of the surface. If the contour of the surface so measured is indicative of the expected contour, than the measurements used are deemed to be acceptable.

FIG. 9

Figure 9:
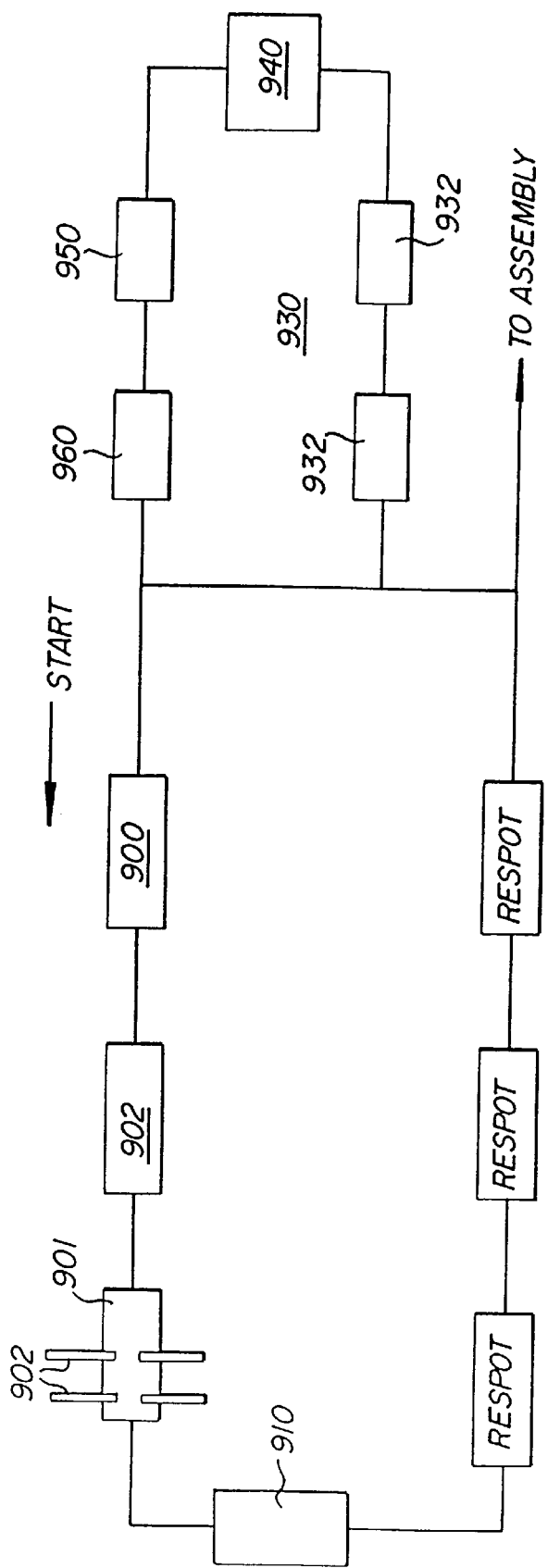
FIG. 9 illustrates an assembly system comprising both reconfigurable tooling and robotically positionable and programable location of parts.

FIG. 9 Illustrates an assembly system comprising both reconfigurable tooling and robotically positionable and programable location of parts.

FIG. 9 illustrates a reconfigurable tool embodiment of the invention, which also may be used in conjunction with programmably reconfigurable fixtures, and has application to car body manufacture. It is based on work described in co-pending applications references above, relative to rapid tool reconfiguration, and programmable panel positioning.

While the particular application here noted is that of a car body assembly application it could be any of the sub-assemblies of the body, or would also suit the manufacture of aircraft and perhaps other 3 dimensional products as well.

As shown, a number of pallets, such as 900, having tooling locators on the them to position the parts of the car, such as sheet metal body panels, on them, are shown which circulate on a loop, where they are joined together, checked, and finished joined (in welding terminology called 'respot', where additional spot welds are placed on them for strength and panel tabs 902, if needed).

The use of circulating pallets for such efforts is not the norm, but has been pioneered by Toyoda, for example in which parts are held down by fixtures on each pallet. 2 major differences are here disclosed.

First, the pallets can be reconfigured as shown on the tool reconfiguration loop 930 (or other suitable tool reconfiguration location). This allows one to change the vehicle to be assembled, such as a new model, or a niche vehicle model to be made on the same pallet, without having to have, as Toyoda did, a huge number of pallets in a warehouse—all set up in an excruciating difficult manner beforehand. It also allows much faster response to market, since the set up can be made under computer guidance and control, as disclosed in my copending applicatoins, as opposed to being built in the tool shops.

The second major difference is that flexible, programmable manipulators are optionally employed, such as described in my co-pending applications, as well as those of the Nissan IBAS system. These manipulators, 902, are shown in the drawing for example at the framing station, 901, and are used to position the panels for tack welding.

Nissans IBAS System, uses an enormously complex station resulted for the car body, having as many as 60 robots, 32 control panels, and virtually unmaintainable in a North American context. The goal here, is to show a system that can work in today's car plant atmosphere's, where the complexity of the system at the programmable flexible framing station, 901, is reduced by use of pallets which can be flexibly changed over to different models to coincide with the operation of the framing station.

This has several other advantages. First, by reducing the complexity of the framing station, 901, requiring less robot positioners to be used, it becomes more possible to add in the direct feedback of machine vision based sensors, for example to determine the part locations and control the process. Nissan was not able to accomplish this in practice, because of the complexity of their station, it is believed, and instead had to use a second station, such as 910 in a less desirable manner to check the work of the framing station and try to feedback data to the next part, as opposed to the more optimal situation of controlling the instant assembly.

Thus 2 major advantages; the use of immediate feedback control, and the reduction and complexity of the framing station for maintenance and purposes is achieved by having the use of the tools on the pallets. Particularly interesting is the reconfigurable tool to cut down the complexity of the pallets themselves, and cut down the number of pallets required, which is a particularly onerous problem if one seeks to try to build a flexible plants, building multiple different vehicles.

In addition using this system one can introduce even completely different parts, such as military vehicles, aircraft components, and the like, as long the robots and other equipment in this line can be adapted to that production. This means then, that a true "dual use" system can be built, which might on the one hand perform welding operations, but would change tooling on the robots could perform drilling and riveting, and other applications on an aircraft component.

A tool reconfiguration station has been described particularly in the my copending application references 5 & 7 above, and preferably, but not necessarily uses a vision based system to guide an operator to position tooling details in space. These tooling details might be changeable, or simply movable/reconfigurable by the operator.

As shown on the tool loop 930, of FIG. 9, the operators would be located first in area, 932, for new tool prep, where they would bring out the tools (being locating blocks, clamps, etc.) and place them in the general areas required for the new tool configuration. This new tool configuration could be down loaded from a computer CAD model of the tool design (tool here again we are reminded is a jig or a fixture, riding on a pallet carrier on a conveyor or AGV). The operators then prepare the tools for their final reconfiguration location in station, 940.

In that station (and there could, in many respects, have to more than 1 of such station in order to accommodate the volumes required), the final operation, typically done manually in this case, is made where the operator places the tools in their correct location under vision guidance, and locks them down. Indeed, the final lock down could be performed at station 950, as opposed to station 940, as long as they were reasonable locked down in 940. This is shown in station 950, where not only is the final tool locator lock down performed, but a final check of the locked down tool is performed.

If the tool is okay, it can be sent back into the main loop, as desired, for making of the new model for which it has been reconfigured. If there are problems at the last station, this tool has to be reworked at 960, and sent back through the tool reconfiguration loop for checking, where this to be kept to a minimum.

This one embodiment can allow the car body plant with a minimum of investment to virtually make any vehicle. Not only can the particular panel lines be done in this way, but so can the major sub-assemblies, such as underbody and side body.

It should be noted that the fixtures that would ride on such tools, dual pallets, would not be dissimilar from those shown in FIG. 2 above, at least for smaller parts. They would contain clamps, locating blocks, etc. It is important to such a system that the joint welding, or other joining mechanisms used be programmable, and that there is very little room if any in a system like this for fixed gun locations.

FIG. 10

It is also contemplated in the invention to provide means for simulating the effects of an intelligent manufacturing process, such as the one herein described, for the purpose of determining any, or all of the following issues.

1. The best locating points for sensors in the process (this is derived from a knowledge base of the different parts, at every stage of the process that are to be used, and the tools available to the process, which could be the total spectrum of cutting tools, or a specific grouping that a certain factory has standardized on.

2. The type of sensors to be used in the process once the points of measurement have been chosen. This has to simulate the effects of different sensors that might be used, and their characteristics, and the ability of them to provide data that is satisfactory to the process from the range, resolution, and accuracy point of view, and their physical size constraints, which could be substantial in some areas, relative to locating them into the machine, or tools to be used.

3. A third area of input to the simulation of the intelligent process is the data gathering ability of the process, for example, in terms of the ability to create a satisfactory data base concerning the individual working element with one working cycle, within 50–200 successive cycles, or whatever is required. (Not all measurements can be taken within any one cycle of a process for example, either do to physical constraints, or to the cycle time required to take the measurements).

For example, multiple sensors located on the turret of the machine tool of FIG. 1 can be employed to check all the part variables produced. However, if one does this on every part, the reduction in cycle time due to movements of the turret in x, y, and rotation can be substantial in a high production area.

For this reason, the sensor reading regime that might be chosen is one of the aspects of the simulation. To choose that reading plan of the sensors that best provides the data required for the control of the instant machine, and of the remainder of the process as the data is fed upstream and downstream from the machine.

Figure 10:
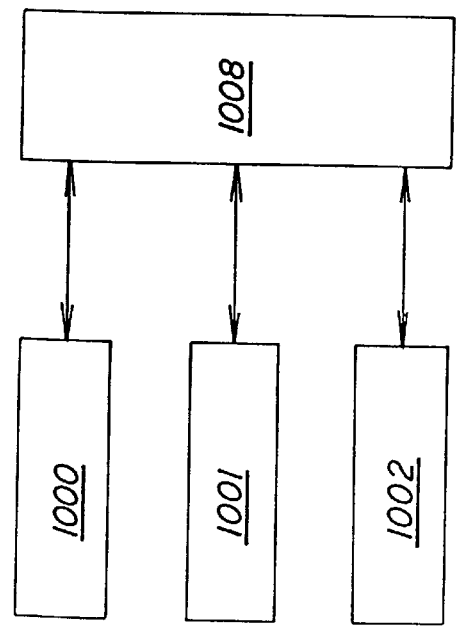
FIG. 10 illustrates steps of programming machine to learn, and the simulation of the learning and data exchange process.

In terms of the simulation, there are many aspects as to how this could be conducted. Each of the individual elements (1000–1002 in FIG. 10) can have an individual simulation of its own which can be run independent of the simulation of the total process need. For example, block 1000 may simulate a first individual operation such as machining. Variables to be perturbed in such a simulation may include, for example, the sensor variable and location, sensor type (optical, capacitance, contact, etc.), data frequency, cycle time, part tolerances and MTBF. Block 1001 may simulate a second individual operation and block 1002 may simulate a third individual operation.

In many cases, this is probably the way it has to be done in the beginning anyway, since it is very difficult to integrate a total process, being hard enough to first introduce simply an intelligent single machine, or tool. In this case therefore, a suggested, but not necessarily required type of simulation is to first run the simulation of the best regime, in terms of data, sensor choice etc. for the control of each individual operation as a stand alone operation. This is shown in Block 1000 above.

Then the individual data elements that could be imputed to the individual operations to improve their performance, or to make their readings more relevant, are simulated in a "what if" scenario, albeit addressing each machines inputs and outputs, and determine what the best operational mode of that machine then becomes. This is Block 1008.

Once this is determined, then the overall process steps can be combined, and the output of the process examined in terms of its speed, efficiency, and quality, and perturbed by the simulation routine to arrive at the best economic combination of

FIG. 11

Automatic, or semi automatic process development using the invention can be achieved as follows. A basic control strategy is to use the sensor data obtained to progressively reduce part variation. The goal is to make the process more stable and predictable, eventually requiring less feedback and sensor corrections (and any reduction in cycle time implied).

There are lots of problems. For example in metal machining applicatons, part heat treat and metallurgy varies from batch to batch, vendor to vendor. Tools become dull, and may not behave consistently (particulary those of interest in cutting dry), stock amounts can vary, previous semi finish or roughing operations may not remove the same amount of material because of different tools or machines used, and the like.

The invention, with its comprehensive sensory capability for all major characteristics can provide automatic data gathering, in production, which can be very useful in building up the control programs to optimize production under these and other conditions. In addition, the machine can be programmed to try to run with constant cutting force, constant chip thickness, or any other possible control relationship within its ability to control, with an eye to home in on the correct combination of parameters for the case at hand.

Another goal is to provide artificial intelligence, capable of optimizing the production on a moment to moment basis, particularly in high production applications where human operators are less able to be attentive or not present at all. This is particularly apropos since production lots vary as to metal content, tool wear, coolant changes, thermal effects occur, and other things which can vary the production ability to maintain highest possible accuracies, speeds or what other parameters.

By having the rapid sensing capability of the invention as provided herein in normal production machines, one can undertake to adjust the machine for varying conditions, and to essentially optimize the process for any given choice of tools and materials. It is common knowledge that in many production plants, the machine settings and tool choices are continued even as material changes, or new tools become available. This results in sub-optimal production, by as much as 20% or more in many cases, resulting in a major waste in terms of the nations productive capacity. It is often is caused simply the lack of engineering, or operator, time, or because of a desire to avoid the risk in making changes. The disclosed invention eases this problem, by taking this load off of the process engineers or operators in the plant and always runs at optimum production capacity, or accuracy, if set to do so.

This then has side benefits in that it more rapidly speeds up the acceptance of new tooling materials and allow perhaps a larger variation in the metallurgical content of parts (within the design of the part), while still maintaining the optimum production. This then can reduce the cost of the material in certain cases.

Certain steps are herein outlined. Any or all of which are possible with the invention.

For machining a given lot of parts, usually but not necessarily from the same casting batch; ie nearly the same metallurgical content:

1. Machine first part with a standard or preknown setting (start with preknown procedure, also will wish to cover the totally unknown.

2. Record beginning size of the part, the finish size, and the micro finish.

3. Record force and thermal build-up if used, if sensing is available.

4. Machine subsequent "n" parts in same way. Build up a table of values including development of an average value.

5. Machine the next (N+1) part with a varied setting chosen by an inference engine from a set of rules relating to that part type, material type, or tool type. This setting, for example, could be just simply increase the speed of the machine by 10%, or to try another tool with a different rake setting, or a tool with a different cutting edge radius. Different tools, for example, could be loaded in the turret of the FIG. 1 device for these trials, although obviously it's easier to vary things like speed, feed, depth of cut.

6. Record data.

7. Repeat the process with another setting, or two settings according to rules set up from expert data put into the machine, from say, turning experts.

8. Build up a table and estimate from rules the optimum setting for this type of part. Try these optimum settings, confirm results, and continue to machine these parts in the manner chosen, or until such time as its desired to attempt further tool types, for example, or the material batch changes.

During the machining of these parts, variations occur beyond the given limit, for example 10% in size or finish. One could then try to optimize around that if a given average variation occurs, say over the m parts.

If too much variation occurs a report is generated for operator intervention. Obviously before such intervention is required a tools can be changed or verified on the tool monitor (such as shown in FIG. 1) for wear and then changed, etc.

The process development steps of the invention above can vary any parameter for the testing, including clamp position, chucks, pallets, and other tool or part variables, to include various materials therefore.

The use of intelligence thus allows one to perform automated tests on material, particularly on the use of tools and other part programs at different feeds, speeds, etc. on machine tools. In fabricated assembly operations, similar trials can be undertaken, for example providing slight variations in locations of tool surfaces in aroder to ascertain process changes as a result, and so to determine the optimum tool locations for any particular batch of stampings say presented to the process. Similarly robot positions can be perturbed to allow the best performance thereof as well.

Figure 11:
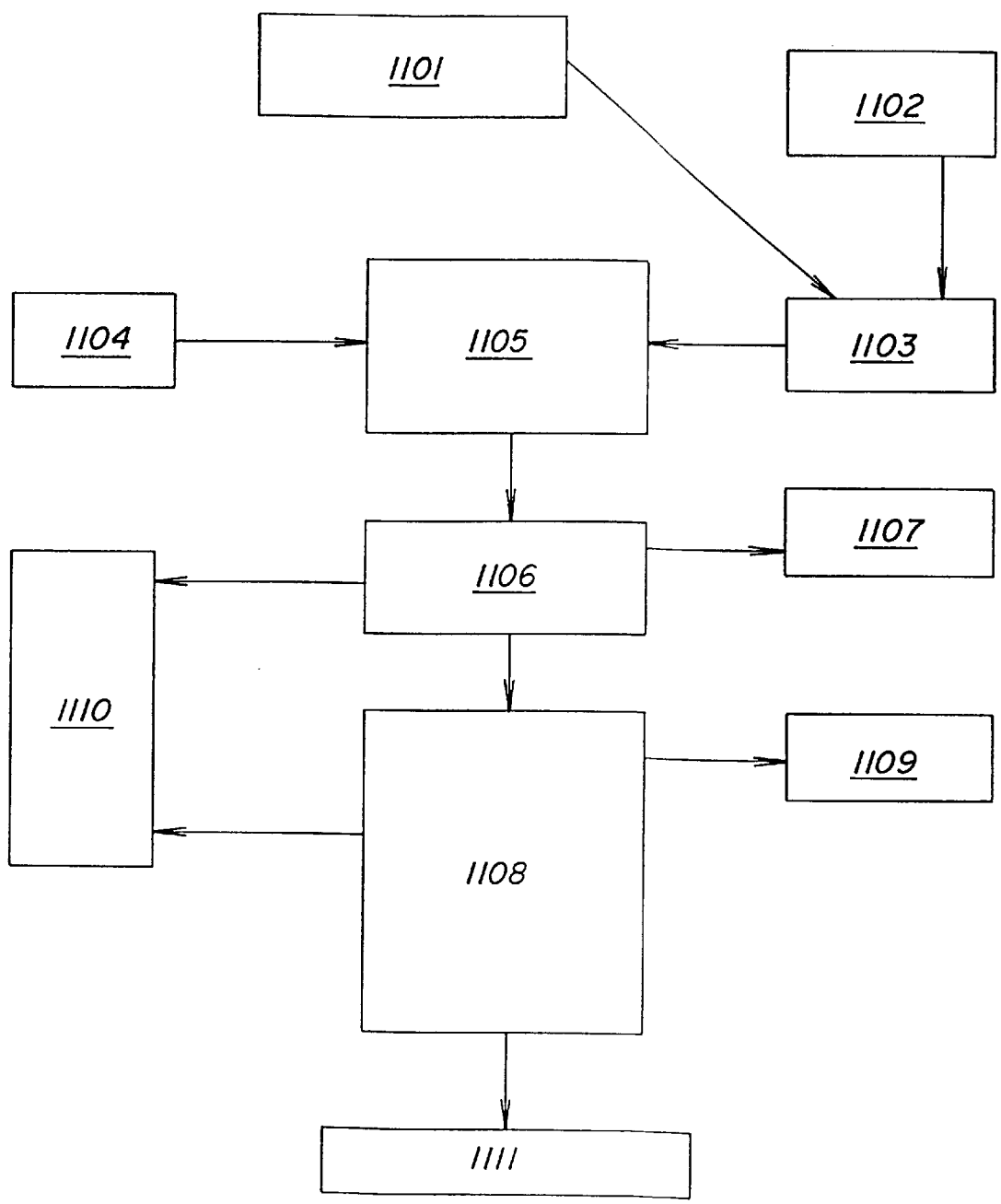
FIG. 11 illustrates a Auto process development embodiment of the invention.

A diagram is shown in FIG. 11 of one development process embodiment of the invention. FIG. 11 shows an automatic process development beginning with a single key machine type in the process, for example a lathe in the shaft example of FIG. 4b.

The process begins with a first data base 1101 of known previous results on parts (tolerances, finishes, etc.) attained using a variety of machine and tool parameters either on the same machine, if available, or on similar machines. Also part of the system is second data base 1102 of known parameters in related processes which are influenced by the instant machine, both upstream and downstream if available. Data-bases 1101 and 1102 are connected to an intelligence computer 1103 in order to make data bases 1101 and 1102 available for use in processing carried out by intelligence computer 1103. An example of intelligence computer 1103 would be an inference machine.

A material is then inputted to the machine via material input 1104 to machine 1105. Machine 1105 is then operated employing a first setting of tool and machine based on information from intelligence computer 1103. The first setting is, if possible, a known "safe setting" and "safe tool choice" in order to create a good part.

Once machining is completed using the first setting in machine 1105, key results are determined using one or more sensors represented schematically as 1106. Key results may include sizes, finishes, etc. and the sensor(s) 1106 may include electro-optical sensors. The results from sensors 1106 are stored in first data storage means 1107.

If the part is determined to meet specifications, it is passed on to the next operation as indicated by 1110. Otherwise, the entire process is repeated as represented schematically by 1108 and employing more aggressive parameters or other parameters determined by intelligence computer 1103. The process is repeated as is desired at different settings and tools attempting to produce a good part by predicting the point at which for any given setting choice the part will become unusable and avoiding that point. The data obtained by the repetition 1108 can be stored in data storage means 1109 and the data obtained from, "N" tests can be analyzed by data analyzer 1111. If at any point a part is determined to meet specifications it is passed to the next operation as represented by 1110.

The process development steps of the invention apply as well to additive processes.

Figure 12A:
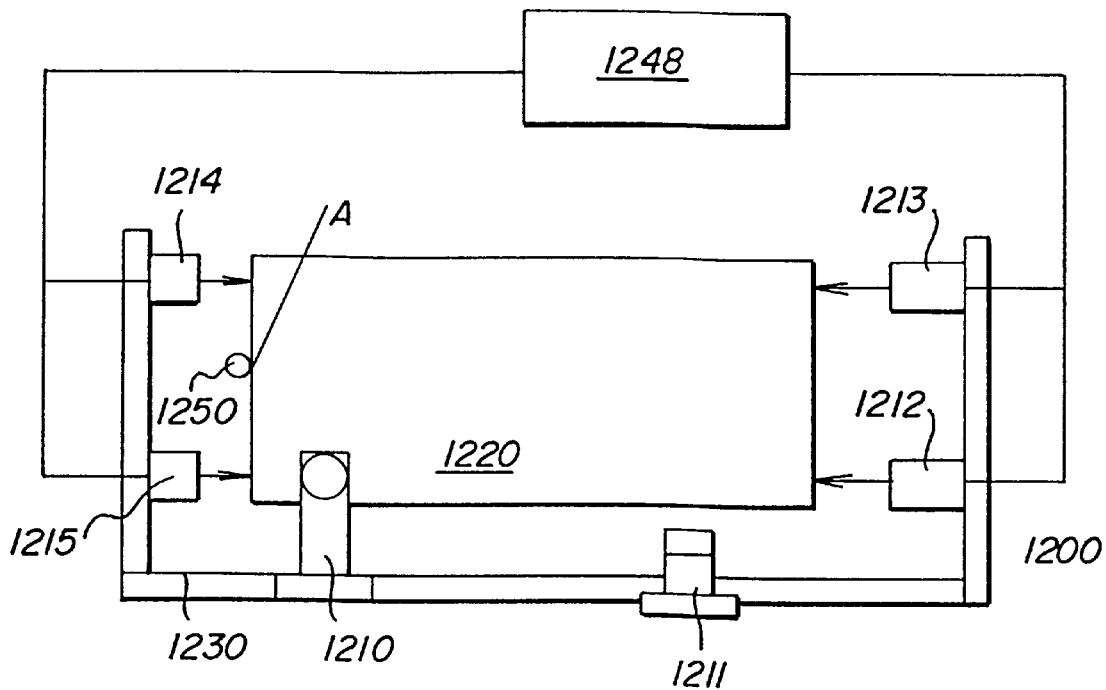
FIG. 12a is a top view of a check fixture and other fixture embodiment of the invention.
Figure 12B:
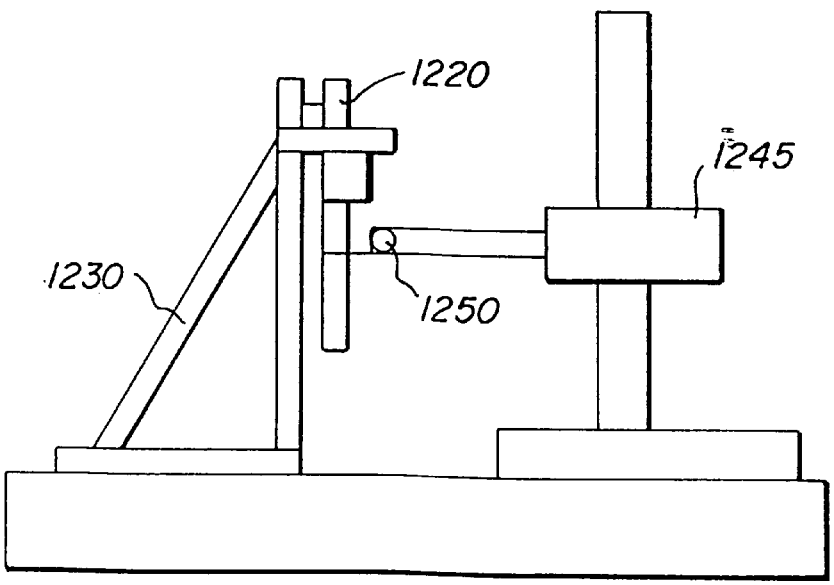
FIG. 12b is a side view of a check fixture installed in a cam.

FIGS. 12a and 12b

FIGS. 12a and 12b illustrates a checking fixture according to the invention, in which the sensor units 1210–1215 are arrayed around the periphery of a panel 1220 in order to look at the various surface locations, or holes thereon, much the same as has been described in the co-pending applications for use in the assembly tools.

The particular improvements here disclosed are the use of a reconfigurable fixture construction along the lines of co-pending applications, and patent reference, and my Vision Fixture Construction Patent in order to create a checking fixture that can be reset up for different parts, or to be used at the end of the model run, and reconverted to the next model.

A further improvement in the checking fixture is the use of a lightweight and easily fabricated structure 1230 to position the panel and the clamping devices commonly used to hold it down against locating blocks (not shown for clarity). The key invention here is not to make the structure a critical high tolerence item, as laid out on surface plates by tool makers, but to make the structure easily put together, also "erector set" fashion, preferably, but not necessarily under the aid of a vision guidance system, such as described in the co-pending application. This lightweight structure therefore allows one to not only save money on the capital cost, and on the production, but to be able to take the checking fixture in its entirety to a CMM, that may be distant from the desired location of the checking fixture, and to use the CMM to accomplish several things.

1. The checking fixture structure acts as a CMM holding fixture, obviating the need to buy such a fixture as a separate item. Only if the checking fixture is constructed in such a lightweight manner can it be used in this fashion.

2. The checking fixture is set up in this case by the CMM, or by the use of a known panel, check on the CMM in the same holding fixture. The optical sensors, as here described, or other non-contact sensors as here described simply measure the points on the panel that have been first measured by the CMM. While the panel itself may not be of the nominal dimension, the sensor units being linear are capable of offsetting this to whatever dimension is measured, and measuring from there using CMM data inputted at 1248.

FIG. 12b shows the checking fixture held in a CMM.

In other words, let us say that point A on the panel was determined by the CMM 1245 using its probe tip 1250 to be 0.5 mm to the high side of the panel position location tolerance for that point, when the panel was located in a certain manner, using the locating fixture. This being the case, the sensor units would be set up so that their zero point was at nominal, but based on a reading of the +0.5. In other words, they would be moved inward, so that they too read +0.5 at that position, and then locked down. By setting up the checking fixture in this way, accurate machining of the fixture for panel location checking purposes is not required Since it is not particularly crucial, where along the length of a long section the measurement is made, but more the in/out flange location for example, or the hole location, this thing can all be adjusted in this manner, using the CMM to assist.

At any time in the future, when one wishes to check the operation of this low cost, but very fast to operate checking fixture, one simply brings it in its entirety, with the sensors and all, to the CMM, sets it up, and essentially reverifies the positions. If the positions of the sensors have moved for some reason, they can be re-zeroed. This ability to compensate for any sorts of drifts in the sensor locations, over some sort of extended time period, allows one to lower the cost of the mechanical build of the fixture, since stress relieving, hardening, other expenses and time consuming tasks often associated with check fixture construction can be eliminated, or at least largely reduced in cost.

It is useful at this point to consider te potential productivity improvement steps of an intelligent machine tool. Productivity of such an intelligent machine is a function of many factors, for example:

1. Reduction of loss time, as in:
   a) tool changes,
   b) part transfers and chucking (or fixturing)
   c) machining time (i.e. the time the tool is in the cut)
   d) the amount of tool change time to make the part itself, if more than one tool is required, and the # of tools so required
   e) the optimization of the cutting material versus cost to allow the maximum speeds
2. Reduction and the elimination of scrap—a major feature of the intelligent machine.
3. The optimal utilization of castings to reduce the amount of material scrapped out for casting reasons, and the optimization of the casting process.
4. Reduction in unscheduled maintenance due to crashes etc. and the reduction in maintenance.
5. The ability to respond to new processes and materials, and to avoid loss of the capital investment or relegation to less important tasks of the machine.

Optimization of Machining Time

One goal is to increase the feed rate until the microfinish is still acceptable.

Also however, one can increase the speed of rotation as well, both until the finish is acceptable, as well as the size in both cases. One can also change tools until the maximum tool radius capable of being run is obtained, which can tend therefore to make the surface finish better for a given feed rate, thereby allowing higher feedrates (or finishes).

I have also found that in certain circumstances, too slow a feed rate can also cause a deterioration of certain surface finishes. Thus it is desirable to be capable of dithering the speeds in both directions until the optimum feedrate is obtained.

The depth of cut can be optimized to allow the minimum number of passes to be taken while still commensurate with the finish and size requirements targeted.

Further, the speed of rotation of the tool, the feed, and the depth of cut can all be altered to approach the point at which chatter occurs, and produce the best size and finish just before the onset of chatter. This is probably the maximum that can be obtained, although the machine is capable of much than a human process engineer of actually dithering all of these functions in its automatic process development function or actually in process to allow the maximum operation before chatter occurs.

This ability of the machine, not a human process engineer or operator, to arrive at the maximum process functionality by exhaustive automated testing provided by the invention is a major advantage. The fact that the machine can sense accurately enough the required process parameters to still make a sufficiently high percentage of good parts while arriving at the optimum process through testing, allows economic testing programmes on a massive (by comparison ) scale to occur. Rejects if any are minimized, and preferably identified, so they don't leak onto the production stream.

The data base of operation data for a given machine or group can also be shared by other machines making similar parts under similar conditions, Thus the further machines can build on the data base generated, if a mechanism such as data networks, CD ROM disks etc is made available.

Machines, not people, can now do the drudgery work of process development in a corporation. Because the invention makes it so much easier, the engineers can concentrate on improving the rules and process models used to predict and correct the process.

The sensor data of generated by the intelligent machine or machines herein disclosed, is combined and processed in the central computer of the machine, or in an external computer perhaps controlling a bank of machines. To assist this effort such computers may utilize "neural net" techniques to learn from the data obtained in the repetitive process of machining sequential parts.

In the same vein, Sensor Teach modes are also possible with the invention. The surface finish sensor, for example, can be taught what are the optical scatter characteristics of a good surface, ideally made in the same process, and it can reference readings to this. As noted it can also be a key input to a control loop; to try to home in on this condition by varying speeds, feeds, etc. The thermal signatures (produced say by IR sensors) measuring zones of good or bad production parts as they heat up due to cutting can be noted and compared to those of test parts. If unusual heat or other conditions are noted, the machine can be determined to be in need of repair, or the process parameters adjusted (eg feeds and speeds for a given material, or the tool in need of changing (which can be optionally confirmed with the tool sensor).

When a sensor such as one used to take diameter readings of a rotating part in a turning machine is fast enough to determine runout at the speed of turning, it is possible to control the tool to move in and out fast enough to dynamically remove the effect of spindle runout, or to put circumferentially contoured surfaces on parts (eg. automotive pistons) which are dynamically measured by the sensor and adaptively controlled. For such purposes very fast actuators of the tool are required.

Methods and apparatus for "Intelligent" control of production processes such as machining, casting, heat treating and welding have been disclosed. The key enabler of such control is electro-optical or other suitable sensors, generally non contact, capable of rapidly and accurately acquiring data from parts and tools used to produce them in a production "in-process" environment.

Systems have been disclosed to control not only the instant operation, but those processes connected therewith, both upstream and downstream. Data bases are generated and knowledge bases are used. Application of the invention can improve quality and productivity, and allow the production of parts which have unusual or individual material characteristics.

Also disclosed in this invention is a method to link video data streamed onto the edge cutting operation onto video tape or other mass storage media for later analysis, and to also include the transmission of such tapes by post, or directly over the wire to remote sites, to allow analysis of the optical signals directly taken by customers, research labs, universities researchers and other.

This video and high data transmission also allows one to transmit any pre-process data, including the dimensions and the like, as well.

Because it is increasingly difficult in modern high precision manufacturing practice to characterize parts—for function and also for accurate assembly, large amounts of data are desireable to perform rapid determination of multi-variable accurate location of part surface, and then adjusting to that surface, the result of all the sensed locations, not just one.

The invention herein can utilize high speed electro-optical or other non contact sensors to determine the part curves and surfaces from the data taken and then make an adjustment to the process. Such adjustments include adjusting a diameter to fit a press fit pin measured using the invention, the machining or mating of gears or th machining of cylinder heads or other formed parts as disclosed in my copending application reference B above, or any other operation where massive real time sensing provided by non contact, and electro-optical sensors in particular, can provide instant data as to a part surface characteristic for use in another operation, where adjustments can be made to said part or to mating or otherwise interacting parts While non contact sensors, and particularly electro-optical sensors are preferable, other sensors such as contact probes can be used for the invention herein. Optical probes can be operated in near ir, visiible and, near UV regions of the spectrum.

Obviously, many modifications and variations of the present invention are possible in light of the above teachings. It is therefore, to be understood that within the scope of the appended claims, the invention may be practiced otherwise than as specifically described.

What is claimed is:

1. A method to optimize the use of new assembly tools or new assembly processes, comprising the steps of:
    (a) assembling at least two parts using an existing process in an assembly apparatus to form an assembly;
    (b) measuring at least one parameter of one of said parts or said assembly using at least one electrooptical sensor which is part of the assembly apparatus;
    (c) recording said at least one measured parameter of one of said parts or said assembly in a database;
    (d) introducing a predetermined, new assembly tool or other predetermined assembly process change;
    (e) measuring at least one parameter of a second part or assembly;
    (f) recording said at least one measured parameter of a second part or assembly in a database;
    (g) determining from said recorded measured parameters at least one change to make in said assembly apparatus or subsequent parts to optimize the use of said assembly apparatus or to optimize said assembly process; and
    (h) making said at least one change.

2. A method as claimed in claim 1 wherein said determining step comprises the step of comparing the measured parameter with information in a data base.

3. A method as claimed in claim 1 wherein the method is fully automated.

4. A method as claimed in claim 1 wherein said measuring steps (b) and (e) include measuring at least two parameters of one of said parts, and said recording steps (c) and (f) include recording said at least two measured parameters from steps (b) and (e), respectively.

5. A control system as claimed in claim 4 wherein the control means changes the position of part locators.

6. A control system as claimed in claim 4 wherein the control means changes the shape of the part locator at a surface of a part being located.

7. A control system as claimed in claim 4 wherein the working parameter is a parameter of a welding apparatus.

8. A control system as claimed in claim 4 wherein the working parameter is a parameter of a clamping device.

9. A control system as claimed in claim 4 wherein the non-contact sensing means is an electrooptical means.

10. A method as claimed in claim 1 further comprising the step of repeating steps (a)–(b) until a desired level of assembly process improvement is obtained.

11. Method of creating an assembly database by learning properties of parts to be assembled, comprising the steps of:
    (a) providing a means for recording a data base,
    (b) providing an assembly apparatus equipped with one or more positioning devices and a plurality of electrooptical sensors for sensing part characteristics, and at least one of positioning device characteristics and assembly apparatus characteristics,
    (c) repetitively assembling parts using said assembly apparatus;
    (d) determining with said sensors the characteristics of said assembly apparatus, positioning device, assembly, and/or part with a first set of assembly apparatus and positioning device parameters, and
    (e) recording same in said data base.

12. A method as claimed in claim 11 further comprising the steps of:
    (f) changing a parameter of said assembly apparatus, or of a positioning device in said assembly apparatus, and
    (g) repeating the process until the database has stored sufficient data for the knowledge desired.

13. A method as claimed in claim 11 wherein said positioning devices comprise fixed part location means.

14. Method of creating a data base by learning of properties of parts desired to be worked in an assembly tool, comprising the steps of:
    (a) providing a means for recording a data base,
    (b) providing a working assembly tool with a plurality of electrooptical sensors of part characteristics and assembly tool characteristics,
    (c) repetitively assembling parts with said assembly tool,
    (d) determining with said sensors characteristics of said assembly tool and part with a first set of assembly tool parameters, and recording same in said data base means,
    (e) changing a parameter of said assembly tool, and
    (f) repeating the process until the data base has stored sufficient data for the knowledge desired.

15. Apparatus for assembling a variety of complex 3-dimensional objects including car bodies, or subassemblies thereof, comprising:
    a base:
    a plurality of movable pallets positionable in a known location relative to said base and having fixture locators for positioning some or all of the parts of at least one 3-dimensional object on said pallets;
    means to reconfigure the fixture locators of at least one of said pallets in 3-dimensions to accommodate at least two different 3-dimensional objects;
    electrooptical sensing means for sensing part characteristics located in a fixed position relative to said base; and
    means to join said parts of said object.

16. Apparatus according to claim 15 comprising further means to programably position at least one of said parts of said object by moving said fixture locators in 3-dimensions to position said parts on said movable pallets.

17. Apparatus according to claim 16 wherein said means to programmably position at least one of said parts includes an electrooptical sensing means for guiding the programmable positioning operation.

18. Apparatus according to claim 15 wherein said means to reconfigure at least one of said pallets includes an optical sensing means for guiding the reconfiguration of at least one of said pallets.

19. Apparatus according to claim 15 further comprising a data base of different objects.

20. A control system for at least one production assembly tool comprising:
   non-contact sensing means which form a part of the assembly tool for sensing part characteristics,
   a knowledge base containing information concerning part characteristics, at least some of which information having been obtained from operation of said non-contact sensing means to sense part characteristics of a plurality of previous parts;
   means to compare sensed data with information in said knowledge base; and
   control means for changing a working parameter, a part assembled in said tool or an assembly tool for a subsequent part assembly as a result of said comparison.

21. A system according to claim 20 wherein said control means includes means for rejecting parts determined to be unsuitable for further production or assembly.

22. A system according to claim 20 wherein said assembly tools are fixed assembly tools.

23. A control system as claimed in claim 20 wherein the knowledge base further comprises other part or process data which is not obtained from the electrooptical sensors.

24. A control system as claimed in claim 20 wherein the knowledge base further comprises data obtained from other assembly tools.

25. A control system as claimed in claim 20 wherein the knowledge base further comprises data obtained from a feeder process for feeding at least one part to the assembly process.

26. A control system as claimed in claim 20 which further comprises a plurality of part location sensors.

27. A control system as claimed in claim 20 wherein said knowledge base is employed to change a part dimension.

28. A control system as claimed in claim 20 wherein said knowledge base is employed to change a part material.

29. A control system as claimed in claim 20 wherein said knowledge base is employed to change a part location in said assembly tool.

30. A control system as claimed in claim 20 wherein said assembly tool is an assembly tool which assembles sheet metal components of car bodies.

31. A control system as claimed in claim 30 wherein said assembly tool receives at least one part from a feeder process step of metal stamping.

32. A control system as claimed in claim 20 wherein the control means changes the position of part locators.

33. A control system as claimed in claim 20 wherein the control means changes the shape of the part locator at a surface of a part being located.

34. A control system as claimed in claim 20 wherein the working parameter is a parameter of a welding apparatus.

35. A control system as claimed in claim 20 wherein the working parameter is a parameter of a clamping device.

36. A control system as claimed in claim 20 wherein the non-contact sensing means is an electrooptical means.

37. Apparatus for producing a sheet metal assembly comprising:
   a base;
   a plurality of movable pallets, positionable in a known location relative to said base;
   tool means operated responsive to a condition of said assembly process for positioning of parts to be assembled on said movable pallets;
   electrooptical sensor means located in a fixed position relative to said base in said tool means for determining the position of at least one specific feature of at least one of said parts by detecting the range to the surface of the metal;
   means for storing data concerning said feature position; and
   means for analyzing said feature position and determining a condition of said assembly process.

38. Apparatus according to claim 37 wherein said tool means comprise fixed assembly tools.

39. An assembly apparatus which comprises at least one assembly tool for assembling at least two parts to a finished assembly,
   an electrooptical sensor means for sensing data from at least one of said assembly tool, said parts or said finished assembly,
   data recording means to record data from the sensor means,
   comparison means for comparing data previously obtained from parts, assemblies or the assembly tool to data from the instant part assembly or assembly tool, and
   determination means for determining from the data comparison changes to be made in the assembly apparatus or parts.

40. A method to control an assembly process which employs at least one assembly tool for assembling parts, said method comprising the steps of determining a part location at at least one point in said assembly process using at least one sensor, providing at least one additional sensor in one or more additional stations in the assembly process for said parts or in a feeder process which feeds parts to said assembly process for determining a part location using said at least one additional sensor, analyzing data from said at least two sensors located at said at least two different assembly stations in said assembly process or said feeder process, and determining from said analysis of data from at least two sensors located at different stations in said assembly or feeder process a change in said assembly process or parts.

41. A method as claimed in claim 40 wherein at least one sensor determines the location of a part in the assembly tool.

42. A method as claimed in claim 41 wherein said sensor for determining the part location in said tool is an electrooptical sensor.

43. A method as claimed in claim 41 wherein said assembly tool comprises a plurality of sensors for sensing the location of parts in said assembly tool.

44. A method as claimed in claim 43 wherein said assembly tool further comprises additional sensors for sensing other variables of the assembly process.

45. A method as claimed in claim 40 wherein said assembly process is a process of assembling sheet metal components of car bodies.

46. A method as claimed in claim 45 wherein said assembly process receives at least one part from a feeder process which employs metal stamping.

47. A method as claimed in claim 46 wherein said assembly tool comprises a plurality of sensors for determining the location of a part in said assembly tool.

48. A method as claimed in claim 40 wherein at least one of said parts is a sheet metal part.

49. A method as claimed in claim 40 wherein at least one of said sensors is an electrooptical sensor.

50. A method as claimed in claim 40 wherein at least one of said sensors is a non-contact sensor.

51. A control system for at least one production assembly tool comprising:
  non-contact sensing means which form a part of the assembly tool for sensing at least one tool variable;
  a knowledge base containing information concerning the at least one tool variable, at least some of which information having been obtained from operation of said non-contact sensing means to sense tool variables;
  means to compare sensed data with information in said knowledge base; and
  control means for changing a working parameter, a part assembled in said tool or an assembly tool for a subsequent part assembly as a result of said comparison.

52. An assembly apparatus for assembling at least two parts to form an assembly, wherein at least one of said parts is a deformable part, comprising:
  (a) means for determining at least one location or dimension of the deformable part prior to deformation;
  (b) means for deforming the deformable part;
  (c) means for determining at least one location or dimension of said deformable part after deformation,
  (d) means for comparing the determined location or dimension from steps (a) and (c); and
  (e) means for controlling said assembly process based on information obtained from said comparison means.

53. An apparatus for creating an assembly database of properties of parts to be assembled, comprising:
  (a) means for recording a database, and
  (b) an assembly apparatus equipped with one or more positioning devices and a plurality of electrooptical sensors for sensing part characteristics and at least one of positioning device characteristics and assembly apparatus characteristics.

54. A method for assembling a variety of complex three-dimensional objects including car bodies, or subassemblies thereof, comprising the steps of:
  (a) providing a plurality of movable pallets positionable in a known location and having fixture locators for positioning some or all of the parts of at least one three-dimensional object on said pallet;
  (b) reconfiguring the fixture locators of at least one of said pallets in three-dimensions to accommodate at least two different three-dimensional objects;
  (c) sensing part characteristics using electrooptical sensing means located in a fixed position relative to said assembly apparatus; and
  (d) joining said three-dimensional parts of said object.

55. A method for controlling at least one production assembly tool comprising the steps of:
  (a) sensing part characteristics using a sensor forming a part of the assembly tool from a plurality of parts sequentially assembled in said assembly tool;
  (b) providing a knowledge base containing information concerning the part characteristics wherein at least some of the information in said knowledge base is obtained from step (a);
  (c) comparing sensed data with information in said knowledge base; and
  (d) changing an assembly tool parameter, a part assembled in said tool or an assembly tool for a subsequent part assembly as a result of said comparison.

56. A method for assembling at least two parts to a finished assembly comprising the steps of:
  (a) sensing data from at least one of said assembly tool, said parts or said finished assembly using a sensor forming a part of the assembly tool;
  (b) recording said sensed data;
  (c) comparing data previously obtained from parts, assemblies or the assembly tool to data from the instant part, assembly or assembly tool, and
  (d) determining from the data comparison changes to be made in the assembly apparatus or parts.

57. A method for controlling at least one assembly tool comprising the steps of:
  (a) sensing at least one tool variable with non-contact sensing means which form a part of the assembly tool;
  (b) providing a knowledge base containing information concerning the at least one tool variable, at least some of which information having been obtained from operation of said non-contacting sensing means to sense tool variables; and
  (c) comparing sensed data with information in said knowledge base.

* * * * *